United States Patent [19]
Kitagawa et al.

[11] Patent Number: 5,062,237
[45] Date of Patent: Nov. 5, 1991

[54] NOOSING BEAR TRAP

[76] Inventors: Nobuhiro Kitagawa, 50-42, Sata, Mihama-cho, Mikata-gun, Fukui-ken; Sigeru Gotsugi, 1-4-1, Sunagare, Tsuruga-shi, Fukui-ken, both of Japan

[21] Appl. No.: 459,371

[22] Filed: Dec. 29, 1989

Related U.S. Application Data

[63] Continuation-in-part of Ser. No. 219,727, Jul. 7, 1988, abandoned.

[30] Foreign Application Priority Data

Nov. 30, 1987 [JP] Japan ............................ 62-182090[U]

[51] Int. Cl.5 .............................................. A01M 23/34
[52] U.S. Cl. ............................................ 43/86; 43/87
[58] Field of Search ..................... 43/88, 85, 86, 87, 76

[56] References Cited

U.S. PATENT DOCUMENTS 2,247,066  6/1941  Popp .
2,894,352  7/1959  McDonald .
3,125,823  3/1964  Smith .
4,471,560  9/1984  Hughan .
4,739,578  4/1988  Pitchford ............................. 43/87

FOREIGN PATENT DOCUMENTS 47-770     1/1972  Japan .
59-34300   9/1984  Japan .
62-42705  11/1987  Japan .

Primary Examiner—Kurt Rowan

[57] ABSTRACT

A noosing bear trap comprises a main body defining an interior space and provided with an access opening which allows insertion of a bear's hand into the interior space for taking a bait placed therein at a position spaced from the access opening. A capturing wire is fixable at one end and formed at the other end with a diametrically variable noosing loop located at or adjacent the access opening. The noosing loop is normally in a non-tensioned condition but adapted to be tensioned for diametrical reduction in response to the movement of the bear's hand for taking the bait.

39 Claims, 13 Drawing Sheets

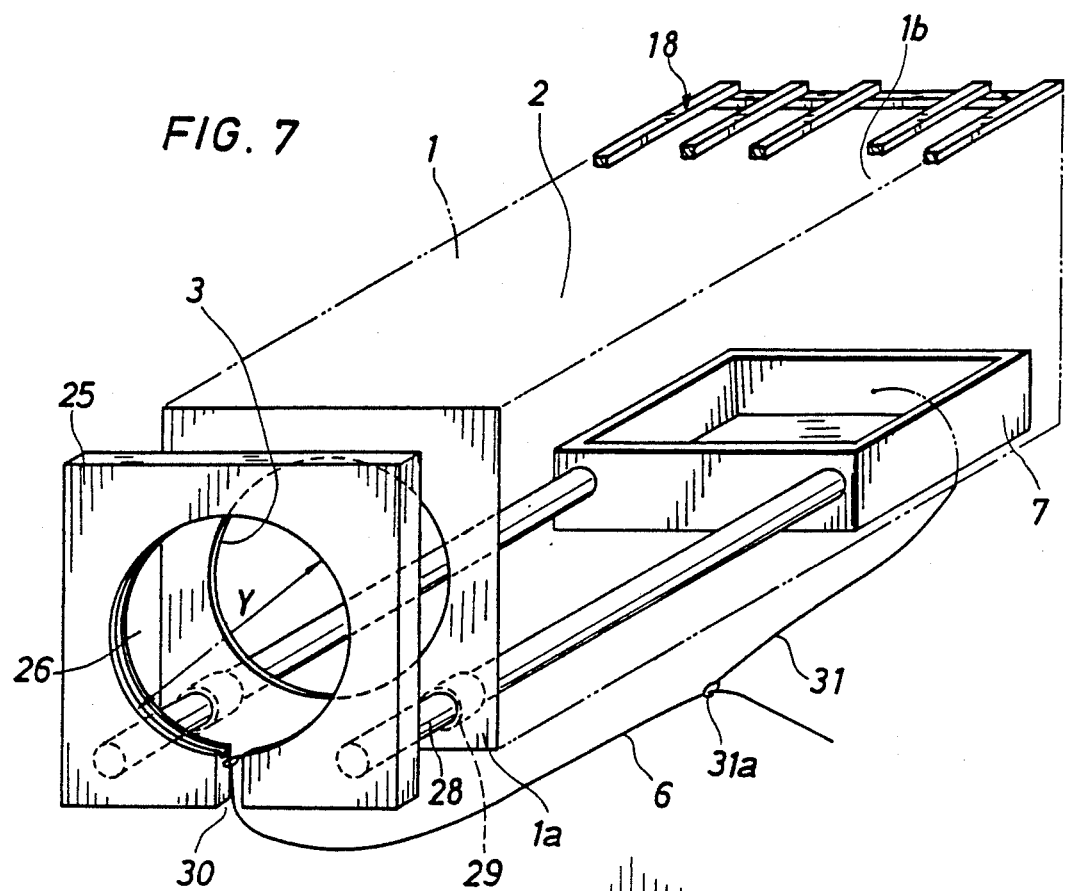
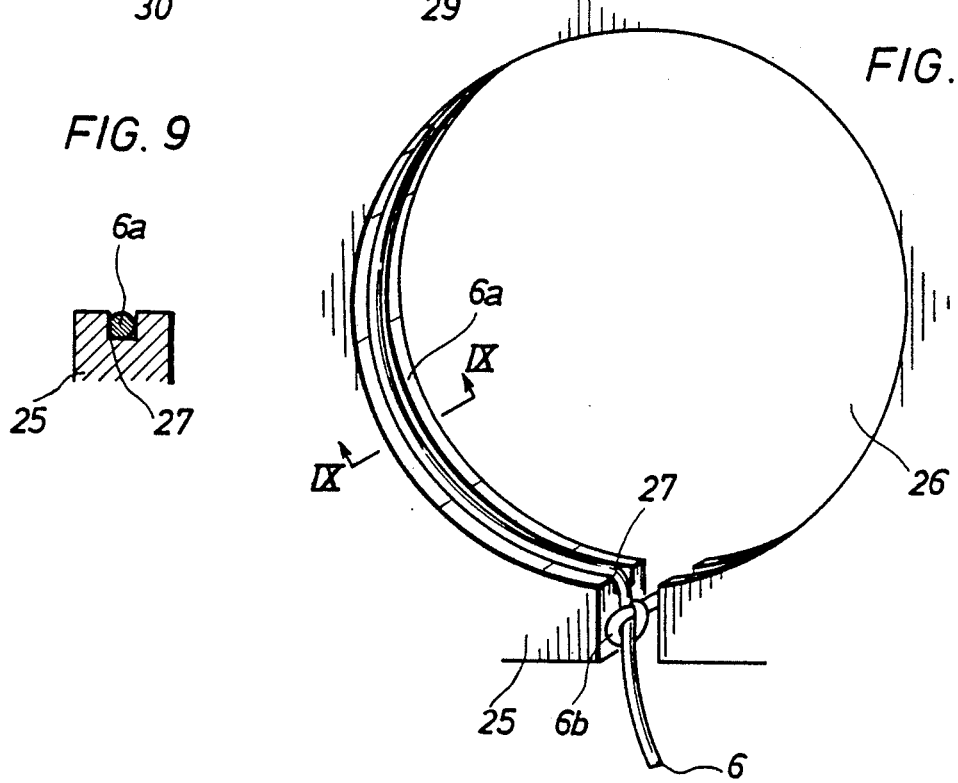

NOOSING BEAR TRAP

This application is a continuation-in-part of application Ser. No. 219,727, filed on July 7, 1988, now abandoned.

BACKGROUND OF THE INVENTION

1. Field of the invention

This invention relates generally to traps for capturing animals, and more particularly to a noosing trap for selectively capturing bears.

2. Description of the Prior Art

For various reasons, it is often necessary to capture animals alive For example, such capturing is required to protect agricultural crops from animal attacks as well as to ensure human safety.

Particularly, bears are known to be very dangerous. In view of this, various traps have been heretofore proposed for capturing bears.

The most typical of traps for bears, or big animals for that matter, is a trap cage. Generally, the trap cage has a door which is normally open but closes, through a trigger device associated with a bait inside the cage, in response to the movement of a bear taking the bait, as disclosed for example in Japanese Utility Model Publication No. 47-770 (Published: Jan. 12, 1972, Inventor and Applicant: Takiji TANAKA).

In fact, the use of such a trap cage is increasingly prohibited possibly to prevent excessive capturing. Further, the trap cage will often capture animals other than bears, thereby failing to provide selective capturing of bears. More importantly, the trap cage is too bulky and heavy for transportation to locations deep in the mountains, so that it can be installed only at limited locations.

Another typical trap, known as a body noosing trap, utilizes a capturing wire having a noosing loop of about 50 cm in diameter. The noosing loop is suspendingly placed slightly above a walking path of bears, and adapted to diametrically reduce under tension upon passage of the bear to trap the body thereof.

The body noosing trap is disadvantageous in that the trapped bear may die if the noosing loop accidentally tightens up the bear's neck. Further, this trap provides a very poor chance of success in capturing because the bear may pass by the trap.

A further typical trap employs a footboard, as disclosed in Japanese Utility Model Publication No. 59-34300 (Published: Sept. 22, 1984, Inventors and Applicants: Sueo WATANABE and Fukio FUKUSHIMA) or in Japanese Utility Model Publication No. 62-42705 (Published: Nov. 2, 1987, Inventor and Applicant: Mitsuo WADA). More specifically, the footboard is pivotally arranged at a pitfall in the ground, and a noosing loop (about 40 cm in diameter) at one end of a capturing wire is placed on the footboard. The footboard is downwardly pivoted when stepped on by a bear or the like to actuate a triggering device which causes diametrical reduction of the noosing loop to arrest a foot (or hand) of the bear.

The footboard trap is also disadvantageous in that it may capture unintended animals such as Japanese serows or raccoon dogs. A more serious problem with this trap is that it is useless in snowy areas. In fact, the footboard trap becomes inoperative with a snowfall of not less than 10 cm.

SUMMARY OF THE INVENTION

It is, therefore, an object of the invention to provide a bear trap which is light in weight to provide ready transportation to any locations in the mountain.

Another object of the invention is to provide a bear trap which enables selective capturing of bears.

A further object of the invention is to provide a bear trap which ensures a high chance of success in capturing bears.

A still another object of the invention is to provide a bear trap which prevents the human from accidentally captured.

A still further object of the invention is to provide a bear trap which is not adversely influenced by snowfall.

According to the invention, there is provided a noosing bear trap comprising: a main body defining an interior space, the main body being provided with at least one access opening allowing insertion of a bear's hand into the interior space for taking a bait placed therein at a position spaced from the access opening; a capturing wire fixable at one end and formed at the other end with a diametrically variable noosing loop located at or adjacent the access opening; and trigger means which causes the loop to be tensioned for diametrical reduction in response to the movement of the bear's hand for taking the bait.

With the arrangement defined above, the main body is required only to have such a size as to accept the bear's hand or arm, so that the trap as a whole can be made small and light to provide ready transportation. Further, since the bear is able to walk or stand erect, the trap may be installed on a tree at a suitable height above the ground. Such installation completely excludes adverse influences of snowfall in addition to providing selective bear capturing and ensuring human safety. Moreover, the bait induces the bear to increase the chance of successful capturing.

The trigger means functions to initially tightens the noosing loop around the arm of the bear in response to the movement of the bear's hand for taking the bait. After such initial tightening, the noosing loop is further tightened up by the bear's own action of escaping because the capturing wire is fixed for example to a tree.

The trigger means may be constructed in various ways, as hereinafter described. For instance, the trigger means may be designed to actuate in response to movement of the main body itself or movement of a bait container relative to the main body.

Other objects, features and advantages of the invention will become apparent from the following description of the preferred embodiments given with reference to the accompanying drawings.

BRIEF DESCRIPTION OF THE DRAWINGS

In the accompanying drawings:

FIG. 7 is a perspective view schematically showing a noosing bear trap according to a fourth embodiment of the invention;

FIG. 8 is an enlarged fragmentary perspective view showing a structure for seating the noosing loop;

FIG. 9 is a sectional view taken on lines IX—IX in FIG. 8;

DETAILED DESCRIPTION

Figure 1:
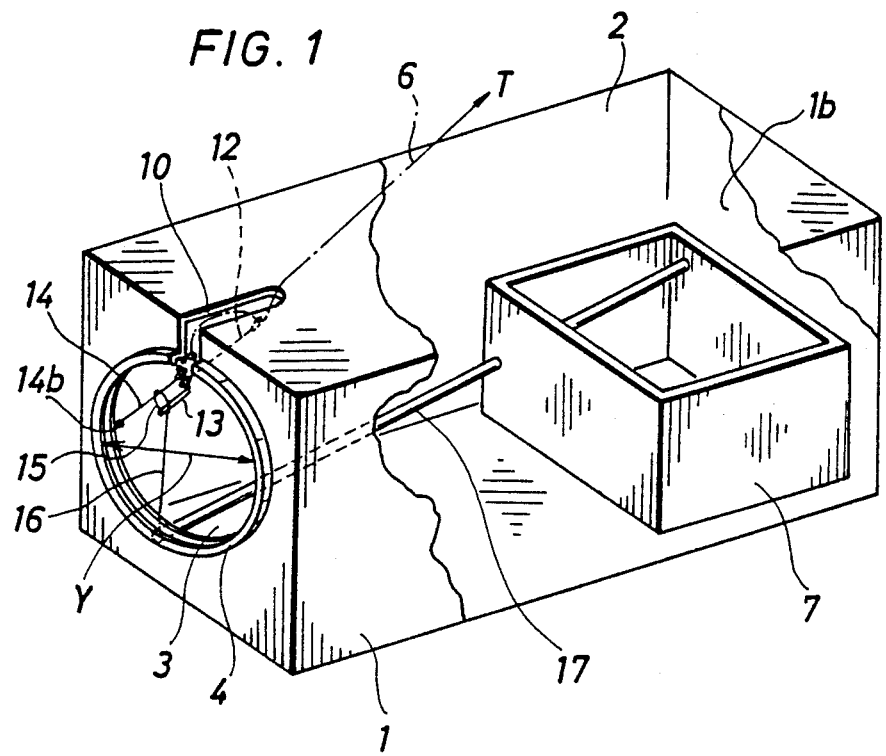
FIG. 1 is a schematic perspective view, partially broken away, of a noosing bear trap according to a first embodiment of the invention.

Throughout the accompanying drawings, identical or similar parts are referred to by the same reference numerals and characters for the convenience of explanation.

Referring now to FIGS. 1 to 4 of the accompanying drawings, a noosing bear trap is illustrated as comprising a rectangular parallelepiped main body 1 defining an interior space 2. The main body 1 has a front wall 1a formed with a circular access opening 3.

Preferably, the main body 1 is made of steel plates to provide a sufficient strength. If required, such steel plates may cover a reinforcing framework consisting of steel bars.

According to this embodiment, the access opening 3 is defined by a pane ring 4 which is formed with an annular groove 5 (FIG. 3) for removably seating a noosing loop 6a (FIG. 4) formed at one end of a capturing wire 6. The diameter Y of the access opening 3 is made as small as possible, provided that it enables insertion therethrough of a bear's hand or arm (not shown). With a large diameter, the noosing loop 6a may fail to catch the bear's arm. Further, if the access opening is made excessively large, it will allow entry of the bear's head with the result that the noosing loop 6a chokes the bear to death. Usually, the diameter D of the access opening 3 is about 150 mm to 160 mm though slightly variable depending on the size (or kind) of bears to be captured.

A bait container 7 is arranged within the interior space 2 of the main body 1 at a position spaced from the access opening 3 but within the reach of the bear. The bait container 7 is movable relative to the main body toward the access opening 3 and receives a bait (not shown), such as honey, which the bear is fond of. To enable placement in the main body of the bait container 7, which is larger in size than the access opening 3, the front wall 1a and/or the rear wall 1b of the main body 1 should be made removable as by bolting (not shown).

Figure 4:
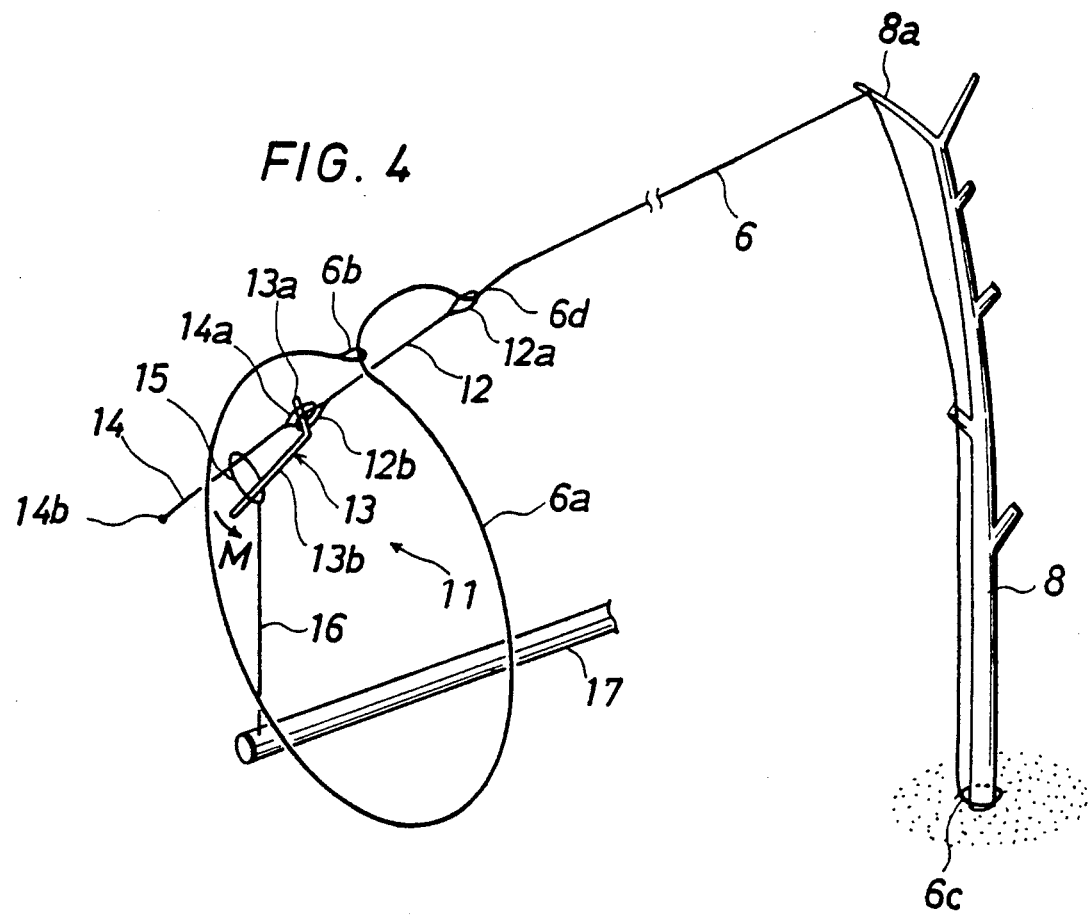
FIG. 4 is an enlarged perspective view showing the arrangement of the trigger means in the bear trap.

As best illustrated in FIG. 4, the noosing loop 6a at one end of the capturing wire 6 is provided with a connecting loop 6b through which passes the capturing wire. Therefore, the noosing loop 6a is diametrically reduced by a tension or pull applied thereto.

Figure 3:
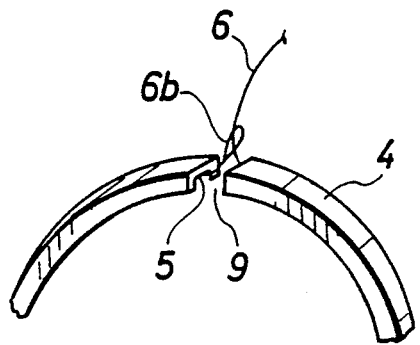
FIG. 3 is an enlarged fragmentary perspective view showing the structure at the access opening of the bear trap.

The capturing wire 6 is guided out for connection at the other end 6c to the trunk 8 of a tree. For this purpose, the pane ring 4 is split at an upper portion thereof to provide an outlet gap 9, as illustrated in FIG. 3. Further, the main body 1 is formed with a guide cutout 10 (FIG. 1) at a location for continuity with the outlet gap 9 of the ring 4. Therefore, the capturing wire 6 is guided out of the pane ring 4 through the outlet gap 9 and out of the main body 1 through the guide cutout 10.

The capturing wire 6 may be normally subjected to a pre-tension T. Such a pre-tension can be imparted for example by engaging an intermediate portion of the capturing wire with a tree branch 8a which has been elastically bent, as illustrated in FIG. 4. However, the pre-tension T is blocked before the noosing loop 6a since otherwise the noosing loop would diametrically reduce prior to bear capturing. Such tension blocking is achieved by a tension blocking device 11.

Figure 2:
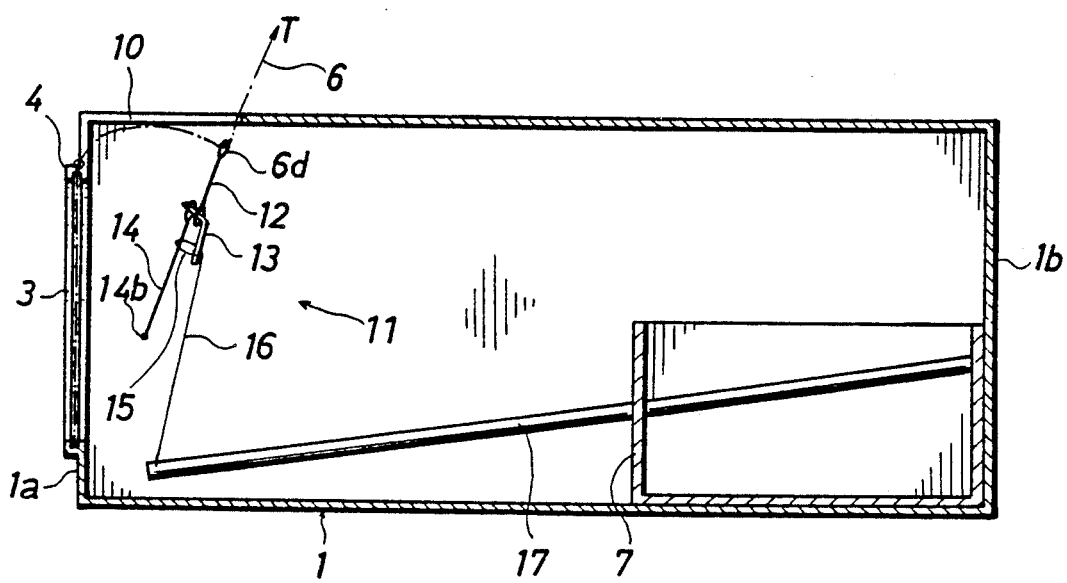
FIG. 2 is a side view, in longitudinal section, of the same bear trap.

In the non-limitative example illustrated in FIG. 4, the tension blocking device 11 comprises an intermediate line 12 having a connecting loop 12a connected to a bent portion 6d of the capturing wire 6 at a position slightly before the noosing loop 6a. The other end of the intermediate line 12 is also formed with a connecting loop 12b which engages with one leg 13a of an L-shaped member 13. The same leg 13a of the L-shaped member 13 also engages with a connecting loop 14a formed at one end of an anchoring line 14 which has its other end 14b fixed to a side wall of the main body 1 (see FIGS. 1 and 2). Normally, the other leg 13b of the L-shaped member 13 and the anchoring line 14 pass through a restraining ring 15 which is connected to a front end portion of a trigger rod 17 by way of a trigger line 16. The trigger rod 17 is mounted to the bait container 7 for movement therewith and extends forward to a position below the restraining ring 15, as illustrated in FIGS. 1 and 2. The tension blocking device 11, the trigger rod 17 and the movable bait container 7 in combination work as a trigger means which initiates diametrical reduction of the noosing loop 6a.

The capturing wire 6 is relatively rigid, so that the bent portion 6d thereof will maintain its bent form to serve like a relatively rigid hook for non-sliding engagement with the connecting loop 12a of the intermediate line 12. Therefore, the tension T is effectively blocked at the bent portion 6d and supported by the intermediate line 12 and the anchoring line 14. The L-shaped member 13 connecting the intermediate line 12 and the anchoring line 14 is subjected to a rotational moment in the direction of an arrow M in FIG. 4 but prevented from rotating by the restraining ring 15.

If required, the intermediate line or wire 12 may be connected directly to the capturing wire 6 without the use of the connecting loop 12a. It should be further appreciated that the noosing bear trap according to the invention may be arranged on a tree (same as or different from that illustrated in FIG. 4) at a suitable height (about 1 m) from the ground.

In operation, a bear (not shown) walking nearby the trap is induced or attracted by the bait (not shown) within the container 7. Then, the bear tries to take the bait by inserting his (or her) hand or arm through the access opening 3, and move the bait container 7 toward the access opening. Such movement of the container 7 causes the restraining ring 15 to be pulled downward by means of the trigger line 16 and the trigger rod 17. Upon disengagement of the restraining ring 15 from the L-shaped member 13, the latter is made to rotate in the arrow M direction, thereby allowing the connecting loops 12b, 14a to slip off the L-shaped member 13. As a result, the pre-tension T is applied to the noosing loop 6a for diametrical reduction around the bear's arm. At this time, the noosing loop 6a has been removed from the annular groove 5 (FIG. 3) of the pane ring 4, so that no damaging force is applied to the main body 1. Since the capturing wire 6 is fixed to the tree trunk 8, the escaping movement of the bear causes the noosing loop 6a to be further tightened up around the bear's arm. In this way, the bear can be captured substantially without failure.

Though not illustrated, the rear wall 1b of the main body 1 may be provided with an additional access opening at which is seated a noosing loop of an additional capturing wire associated with a trigger means similar to that illustrated in FIG. 4. In this case, the main body 1 is doubled in length, while the bait container 7 is arranged intermediate the two access openings.

Figure 5:
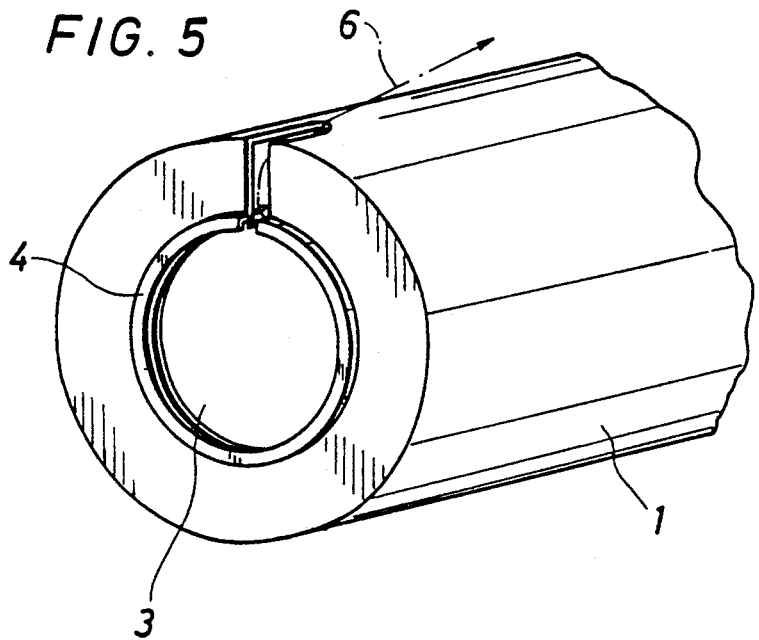
FIG. 5 is a fragmentary perspective view schematically showing a noosing bear trap according to a second embodiment of the invention.

The main body 1 may be cylindrical as illustrated in FIG. 5.

Regardless of the shape of the main body 1, the bait container 7 is preferably disposed as remote from the access opening 3 as possible. Such an arrangement ensures that the bear must insert his (or her) arm to the greatest possible extent to reach the bait, so that the noosing loop 6a will tighten the bear's arm at a position remote from his (or her) hand to decrease the chance of escape.

Figure 6:
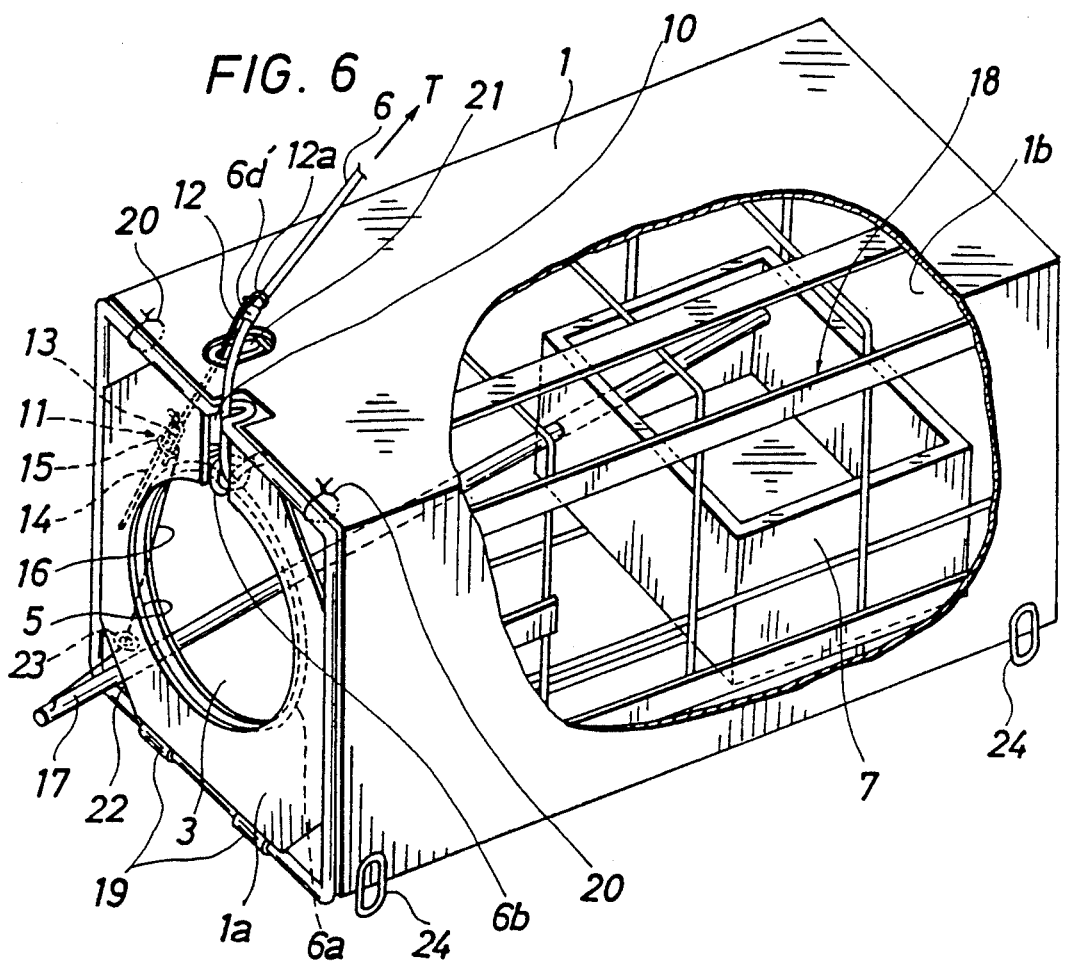
FIG. 6 is a perspective view, partially broken away, showing a bear trap according to a third embodiment of the invention.

FIG. 6 shows a modification from the embodiment of FIGS. 1 to 4. The modified bear trap includes a main body 1 which is reinforced by a steel framing 18. The main body is provided with a front wall 1a hinged thereto at 19. The front wall or lid 1a is normally held closed by means of removable wire holders 20, but may be opened by removing the wire holders for resetting of the trap for example.

The front lid 1a has an access opening 3 which is formed with an annular groove 5 for seating a noosing loop 6a of a capturing wire 6. One end of the noosing loop is located at a guide cutout 10 of the lid and formed with a connecting loop 6b in the form of a knot in which passes the capturing wire to be guided out through the guide cutout 10.

The main body 1 is formed with a line guide opening 21 at a position adjacent to the guide cutout 10 of the front lid 1a. The capturing wire 6 subjected to a pre-tension T is provided with a line stopper 6d' above the guide opening 21. The pre-tension of the capturing wire is blocked at the line stopper 6d' by means of a tension blocking device 11 which includes an intermediate line 12. This intermediate line is led out through the guide opening 21 and formed at one end (external end) with a connecting loop 12a engaging with the line stopper.

The tension blocking device 11 further includes a trigger rod 17 carried by a bait container 7 for movement therewith. The trigger rod is extended forward to project out through a corner opening 22 of the front lid 1a. A trigger line 16 of the tension blocking device 11 is connected to the projecting front end of the trigger rod. The front lid 1a is provided with a guide ring 23 to smoothly guide out the trigger line 16 through the corner opening 22 for connection to the projecting rod end.

The main body 1 may be mounted on a tree branch (not shown) by utilizing mounting rings 24 fixed to the bottom of the main body. The noosing bear trap of FIG. 6 including the tension blocking device 11 is otherwise the same as the embodiment shown in FIGS. 1 to 4. Obviously, this noosing bear trap operates substantially in the same manner as already described.

In the embodiment of FIGS. 1 to 6, the capturing wire 6 is subjected to the pre-tension T which is cut off by the blocking device 11 at a position before the noosing loop. However, such a pre-tension of the capturing wire and the tension blocking device therefor may be obviated, as described below.

In FIGS. 7 to 9, a rectangular parallelepiped main body 1 defining an interior space 2 has a cage-like framework 18 providing the four sides (including the top and bottom sides). The main body further has a front plate 1a and a rear plate 1b. The use of the cage-like framework 18 contributes greatly to overall weight reduction while satisfying strength requirements.

The front plate or wall 1a is provided with an access opening 3. According to this embodiment, however, this access opening 3 is not used to seat a noosing loop 6a of a capturing wire 6. Instead, an external movable plate 25 is arranged ahead of the front wall and formed with a second access opening 26 at which the noosing loop 6a is seated. More specifically, the access opening 26 of the external plate 25 is formed with an annular groove 27 for removably seating the noosing loop 6a, as better illustrated in FIGS. 8 and 9.

The two access openings 3, 26 are coaxial and equally has a diameter Y which allows intimate insertion of a bear's hand or arm into the main body 1. If desired, the external movable plate 25 may be arranged in contact with the front wall 1a of the main body 1.

The external movable plate 25 is connected through a pair of pusher rods 28 to a bait container 7 which is movably arranged within the main body 1 at a position spaced from the access opening 3. Each pusher rod 28 is projectable outward through a guide tube 29 for connection to the external plate 25. Thus, the external plate 25 is movable together with the bait container 7.

Further, the external plate 25 is formed with a lower guide cutout 30 for guiding the capturing wire 6 out of the annular groove 27. The capturing wire 6 thus guided out is connected at its unillustrated remote end to the trunk of a tree (not shown) for example. Further, the capturing wire 6 is connected at an intermediate portion to one end of a pull line 31 by means of a connecting loop 31a. The other end of the pull line 27 is connected via a pulley 32 (see FIG. 12) to the bait container 7 at a side thereof opposite the pusher rods 28.

In an installed condition, the capturing wire 6 and the pull line 31 should be set with no or little sag because otherwise the connecting loop 31a may slide relative the capturing wire 6 to hinder intended functioning of the trap, as hereinafter described Alternatively, the pull line 31 may be connected directly to the capturing wire 6 without the use of the connecting loop 31a. In this case, there may be a large sag in a portion of the capturing wire 6 extending from such a connection to the tree trunk (point of fixation).

Figure 10:
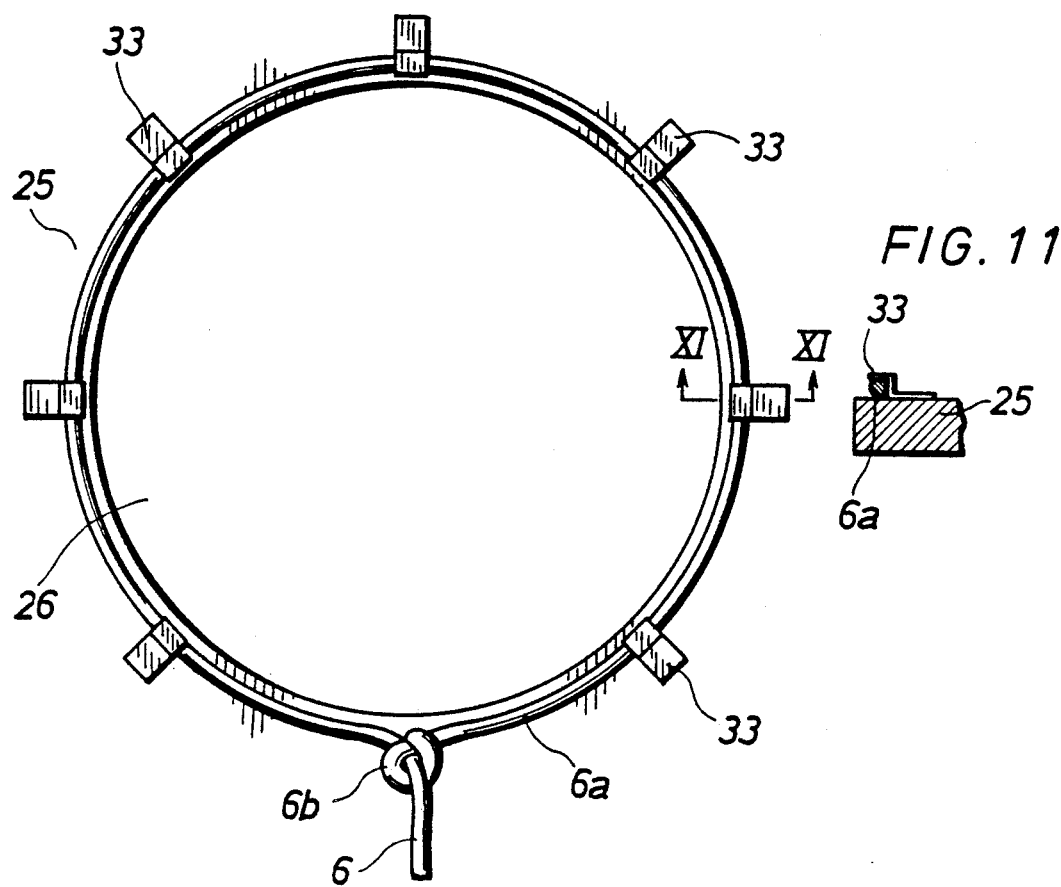
FIG. 10 is a front view showing another structure for seating the noosing loop.
Figure 11:
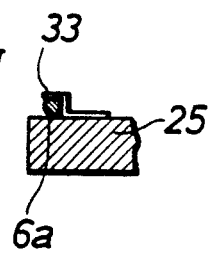
FIG. 11 is a sectional view taken on lines XI—XI in FIG. 10.

As illustrated in FIGS. 10 and 11, the noosing loop 6a may be removably held at the access opening 26 of the external movable plate 25 by a plurality of engaging members or clips 33 arranged closely around the access opening 26 at equal angular spacing.

Figure 12:
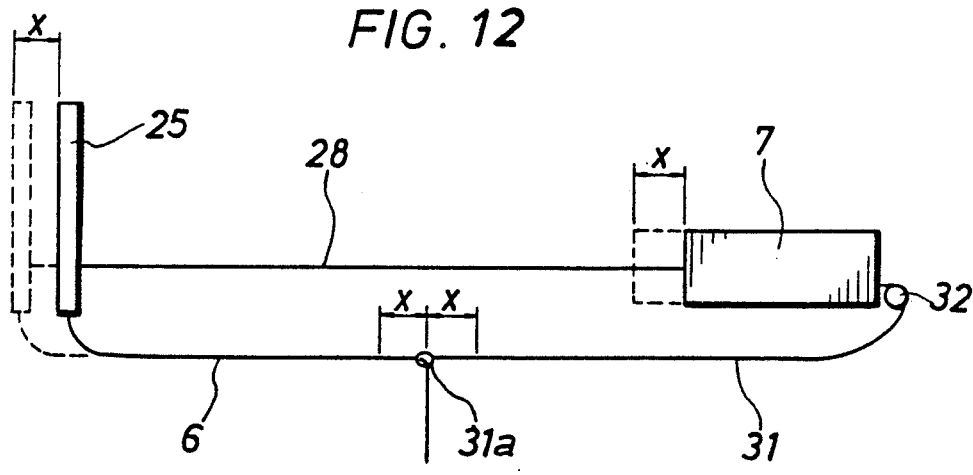
FIG. 12 is a schematic view illustrating the operation of the trigger means in the bear trap of FIG. 7.

In operation, when the bait container 7 is moved toward the access opening 3 of the main body 1 by a bear's hand trying to take the bait, the external movable plate 25 is pushed by the pusher rods 28 away from the main body 1. Supposing now that the bait container 7 moves by a distance x as shown in FIG. 12, the external plate 25 also moves by the same distance x in the same direction. As a result, the pull line 31 and the capturing wire 6 are pulled in opposite directions respectively by a distance x (2x in total). However, since there is substantially no slide between the capturing wire 6 and the connecting loop 31a as hereinbefore described, the position of the connecting loop 31a relative to the capturing wire 6 remains unchanged, so that the noosing loop 6a must diametrically reduce to compensate for the above mentioned pull. In this way, the noosing loop 6a is removed from the annular groove 27 (or the clips 33) to initially tighten the bear's arm. The noosing loop 6a will be further tightened up by the bear's own movement of escaping.

Preferably, the connecting loop 31a of the pull line 31 should be designed to withstand a relatively weak pull applied upon initial diametrical reduction of the noosing loop 6a but to break under a strong pull applied by the bear's action of escaping. Such design ensures that the main body 1 as a whole will not be subjected to a damaging large force, consequently enabling repeated use of the trap.

The bait container 7 is required to place a fluid bait such as honey. However, such a container is not necessary when using a solid or half-solid bait such as smoked meat. In this case, an engaging plate (not shown), which may be connected to the pusher rods 24, is movably disposed within the main body 1 for engagement with a bear's hand taking the bait.

FIGS. 13 to 16 show various modifications which can be made to the embodiment illustrated in FIG. 7.

Figure 13:
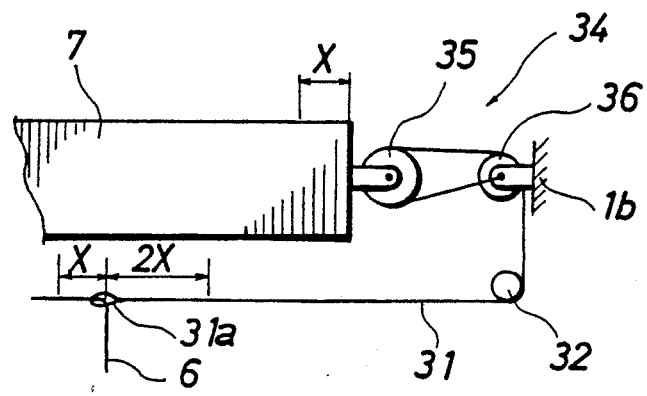
FIG. 13 is a fragmentary side view showing a displacement magnifying mechanism to be combined with the bear trap illustrated in FIG. 7.

The modified bear trap shown in FIG. 13 differs from the embodiment of FIG. 7 only in that it employs a displacement magnifying mechanism 34 for accelerating diametrical reduction of the noosing loop 6a (see FIG. 9) upon movement of the bait container 7. The magnifying mechanism comprises a running pulley 35 carried by the bait container, and a fixed pulley 36 mounted on the rear wall 1b of the trap main body (not entirely shown). The pull line 31 guided by the guide pulley 32 is reeved through the pulleys 35, 36 for fixation at one end to the rear wall 1b.

According to the arrangement of FIG. 13, when the bait container 7 is moved by an amount x, the capturing wire 6 itself is pulled by the same amount x, whereas the pull line 31 is pulled by a double amount 2x due to the magnifying mechanism 34. As a result, the noosing loop 6a (see FIG. 9) is diametrically reduced by a triple amount 3x. Therefore, even a small movement of the bear's hand for taking the bait will cause the bear's arm to be reliably captured by the noosing loop 6a.

Figure 14:
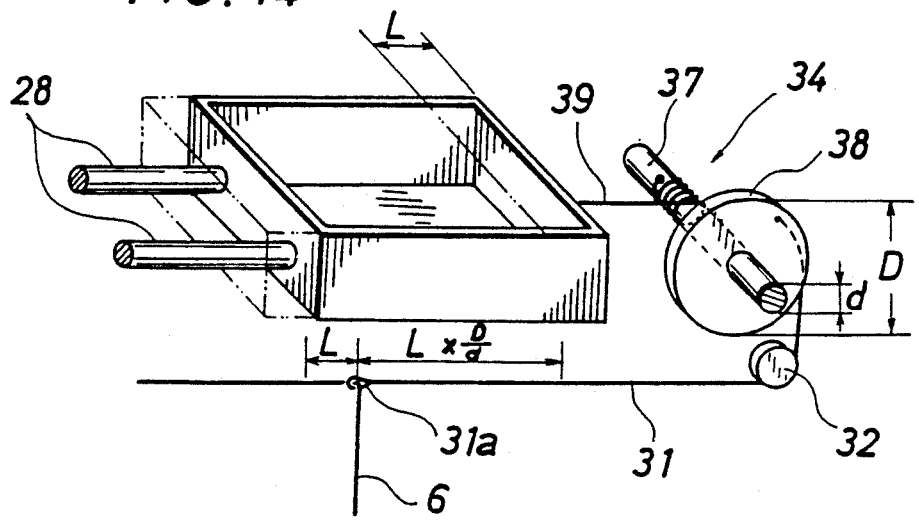
FIG. 14 is a fragmentary perspective view showing another displacement magnifying mechanism to be combined with the bear trap illustrated in FIG. 7.

The modified bear trap shown in FIG. 14 also incorporates a displacement magnifying mechanism 34. This magnifying mechanism comprises a rotary shaft 37 rotatably supported by the trap main body (not shown), a magnifying pulley 38 mounted on the rotary shaft for rotation therewith, and an actuating line 39 wound round the rotary shaft and having one end fixed to the bait container 7. The pull line 31 guided by the guide pulley 32 is fixed at one end to the magnifying pulley 38 for winding therearound.

It is now assumed that the rotary shaft 37 has a diameter d, whereas the magnifying pulley 38 has a diameter D. When the bait container 7 is moved by an amount L, the capturing wire 6 itself is pulled by the same amount L. On the other hand, the pull line 31 is pulled by an amount of L multiplied by D/d. As a result, the noosing loop 6a (FIG. 9) is diametrically reduced by an amount of $L + L \times D/d$. Thus, by setting the ratio D/d at a large value, it is possible to sufficiently reduce the diameter of the noosing loop by a small movement of the bait container 7.

Figure 15:
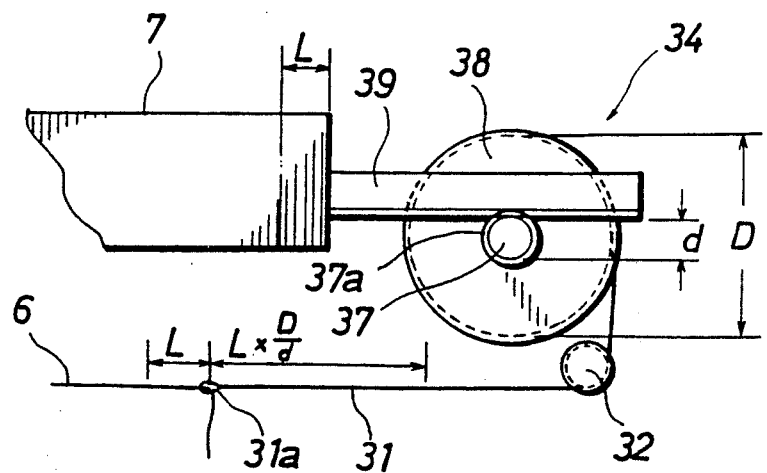
FIG. 15 is a fragmentary side view showing still another displacement magnifying mechanism to be also combined with the bear trap of FIG. 7.

FIG. 15 shows another displacement magnifying mechanism 34 which comprises a rotary shaft 37 of a smaller diameter d formed with an intermediate toothed portion 37a, a magnifying pulley 38 of a larger diameter D mounted on the rotary shaft for rotation therewith, and a rack 39 carried by the bait container 39 in mesh with the toothed portion 37a. With this arrangement, the noosing loop 6a (see FIG. 6a) is diametrically reduced by an amount of $L + L \times D/d$ when the bait container 7 is moved by an amount L.

Figure 16:
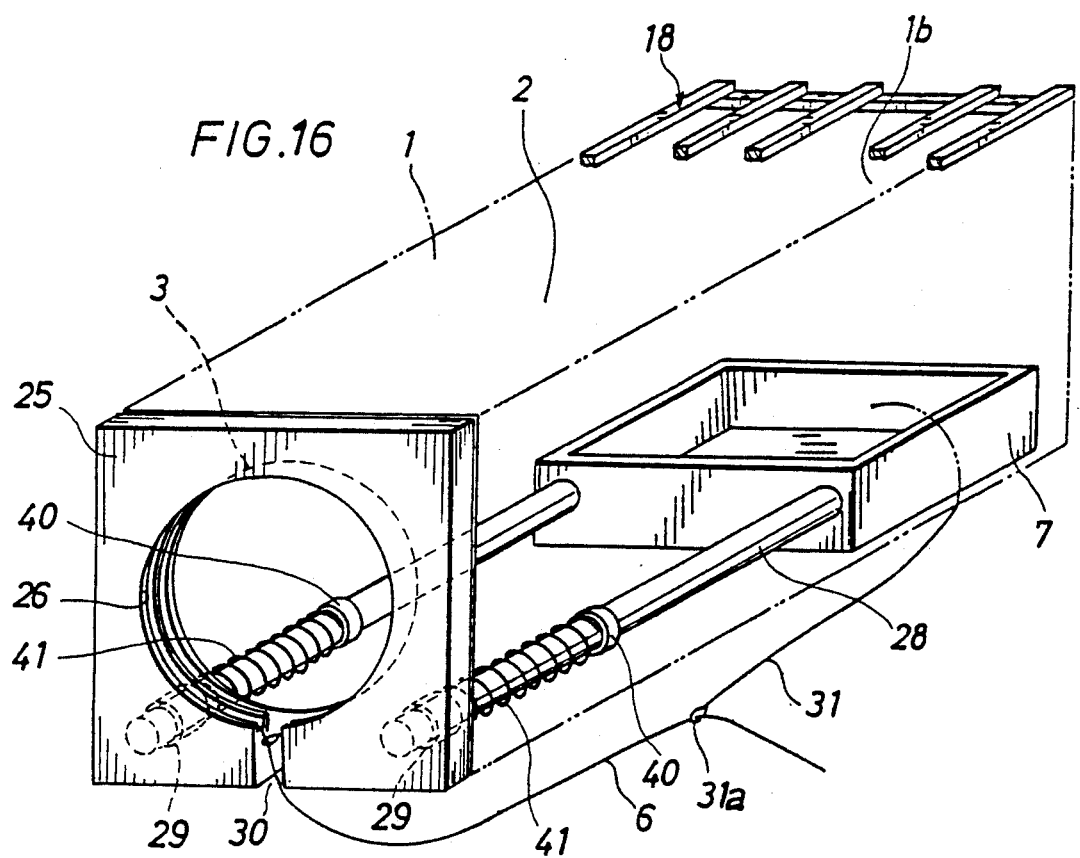
FIG. 16 is a perspective view showing a bear trap according to a fifth embodiment of the invention which is a slight modification of the embodiment shown in FIG. 7.

The modified trap shown in FIG. 16 differs from the embodiment of FIG. 7 only in that each pusher rod 28 is formed with an intermediate stopper flange 40, and a coil spring 41 is interposed between the stopper flange and a corresponding guide tube 29.

The modification of FIG. 16 is more advantageous than the embodiment of FIG. 7 in the following two respects. First, the trap can be easily set in its operating condition because the bait container 7 together with the movable external plate 25 may be automatically returned to the operating position by the action of the springs 41. Secondly, the springs 41 prevent the bait container 7 from being unexpectedly moved by a small or medium sized animal such as marten or sable, thereby avoiding an erroneous actuation of the bear trap. For this purpose, the springs 41 may be rendered strong enough so that only a bear can move the bait container 7 against the urging force of the springs.

Figure 17:
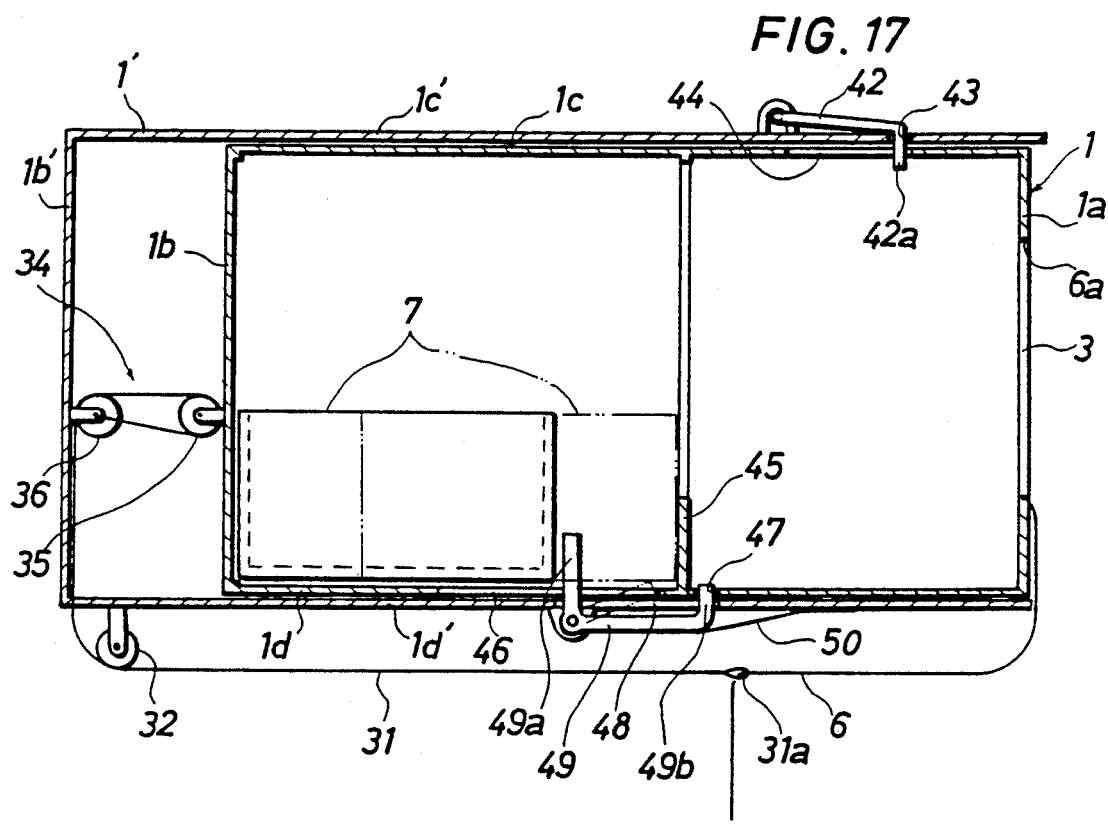
FIG. 17 is a sectional side view showing a bear trap according to a sixth embodiment of the invention.

Another bear trap illustrated in FIG. 17 comprises a main body 1 which is slidably received in an outer casing 1'. The outer casing 1' has a top wall 1c' provided with a pivotal arm 42 having an engaging pawl 42a which penetrates downward through a hole 43 formed in the top wall of the outer casing. The trap main body 1 has a top wall 1c formed with a guide slot 44 in which the engaging pawl 42a of the pivotal arm 42 is slidably received Thus, the main body 1 is slidable relative to the outer casing 1' within the range allowed by the guide slot 44. If required, the main body may be taken completely out of the outer casing by pivoting up the arm 42.

Similarly to the foregoing embodiments, the main body 1 has a front wall 1a formed with an access opening 3 at which a noosing loop 6a of a capturing wire 6 is arranged. The main body further has a bottom wall 1d which is formed with an intermediate container stopper 45 as well as with a slot 46. The bottom wall is further formed with a hole 47. Within the main body is arranged a bait container 7 at a position close to the rear wall 1b of the main body.

The outer casing 1' has a bottom wall 1d' formed with a slot 48 and supporting a pivotal lever 49. The pivotal lever has a leg 49a penetrating the slots 46, 48 to be positioned in front of the bait container when the trap is set in its operating condition. The pivotal lever further has an engaging pawl 49b engaging in the hole 47 of the main body. The set posture of the pivotal lever is held by a retaining leaf spring 50 which acts to urge the engaging pawl 47 into the hole 47. Thus, the main body 1 is prevented from sliding relative to the outer casing 1' as long as the engaging pawl 49b of the pivotal lever engages in the hole 47 of the main body.

The noosing loop 6a of the capturing wire 6 is diametrically reduced by the sliding movement of the main body 1 relative to the outer casing 1'. For this purpose, a pull line 31 having a connecting loop 31a is connected to the capturing wire 6 in the same manner as in the embodiment of FIG. 7. This pull line is guided by a guide pulley 32 and incorporated into a displacement magnifying mechanism 34 which is similar to the one shown in FIG. 13.

Specifically, the magnifying mechanism 34 includes a running pulley 35 carried by the rear wall 1b of the main body 1, and a fixed pulley 36 mounted on the rear wall 1b' of the outer casing 1'. The pull line 31 is reeved through the two pulleys 35, 36 before being fixed to the rear wall 1b' of the outer casing.

With the arrangement shown in FIG. 17, when a bear inserts a hand through the access opening 3 and moves the bait container 7 forward to take the bait inside, the bait container engages the leg 49a of the pivotal lever 49 and causes the lever to pivot downward against the biasing force of the leaf spring 50, as indicated in phantom lines. As a result, the engaging pawl 49b of the lever disengages from the hole 47 of the main body. The bait container 7 further moves forward to come into abutment with the container stopper 45, which causes the main body 1 to slide forward relative to the outer casing 1'. Combined with the functions of the pull line 31 and the displacement magnifying mechanism 34, such sliding movement of the main body results in that the noosing loop 6a is diametrically contracted to arrest the bear's arm.

The arrangement of FIG. 17 is advantageous in that the trap is actuated only when the bear's arm is inserted sufficiently to reach the bait container 7, so that the noosing loop 6a catches the bear's arm at a suitable portion thereof to prevent subsequent escape of the bear. Obviously, even if the bear tries to move the main body 1 by grabbing the front wall 1a, the main body is prevented from moving by engagement of the lever pawl 49b with the hole 47 of the main body, thereby preventing premature actuation of the trap.

Figure 18:
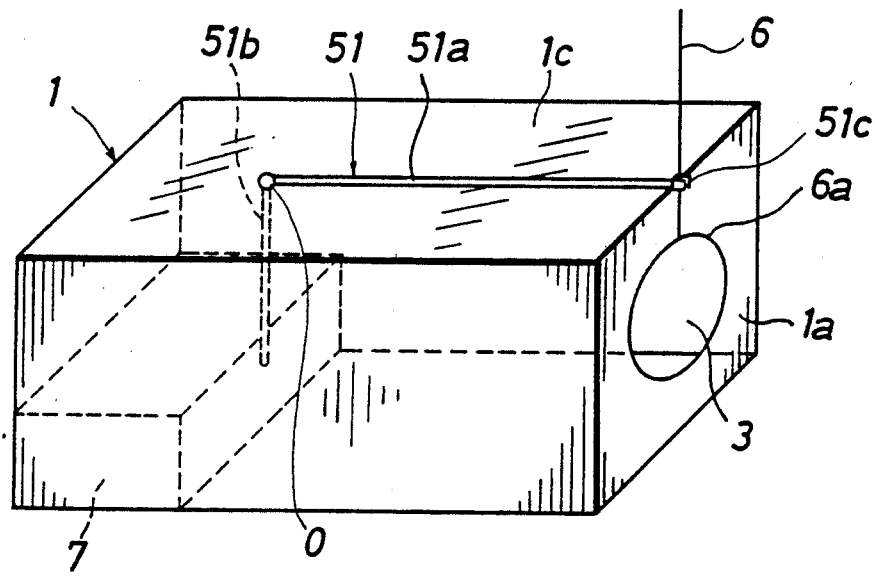
FIG. 18 is a schematic perspective view showing a noosing bear trap according to a seventh embodiment of the invention.

FIG. 18 schematically shows another bear trap comprising a rectangular parallelepiped main body 1 in which is movably disposed a bait container 7. A capturing wire 6 has a noosing loop 6a located at an access opening 3 formed in the front wall 1a of the main body 1. An L-shaped lever 51 as a trigger means is pivotally mounted on the main body 1. The lever 51 has a longer horizontal leg 51a normally supported on the top wall 1c of the main body and connected to the capturing wire 6 at a position slightly before the noosing loop 6a, as indicated at 51c. The lever 51 further has a shorter vertical leg 51b projecting into the main body 1 for engagement with the bait container 7. The pivotal point O of the lever 51 is located at a bent portion thereof located on the top wall 1c of the main body.

With the above arrangement, when the bait container 7 is moved toward the access opening 3, the lever 51 is pivoted up to cause initial diametrical reduction of the noosing loop 6a. Because the horizontal leg 51a of the lever is longer than the vertical leg 51b, the movement of the bait container 7 is transmitted to the capturing wire 6 as amplified for accelerating diametrical reduction of the noosing loop 6a. Preferably, the connection 51c between the lever 51 and the capturing wire 6 is designed to endure a relatively small force applied upon initial diametrical reduction of the noosing loop 6a but to allow removal of the capturing wire 6 under a large force subsequently imparted by the escaping movement of the trapped bear.

Figure 19:
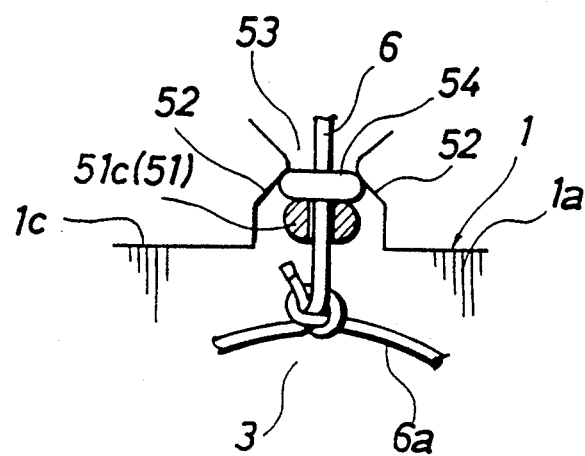
FIG. 19 is a fragmentary front view showing a modification to be made to the embodiment shown in FIG. 18.

FIG. 19 shows a modification which may be made to the embodiment of FIG. 18. Specifically, the main body 1 is designed to have a top wall 1c which is formed with a pair of riser portions 52 immediately above the access opening 3. The pair of riser portions are bent to define a neck 53 therebetween. A stopper flange 54 is fixed on the capturing wire 6 to engage with the neck 54 from below. The horizontal leg 51a of the L-shaped lever 51 (see FIG. 18) has a front clipping end 51c to engage the stopper flange 54 from below.

According to the modification of FIG. 19, the stopper flange 54 can pass through the neck 53 against the elasticity of the riser portions 52 only when a sufficient upward force is applied to the stopper flange by the lever. The combination of the stopper flange and the neck is therefore advantageous in the following points. First, it is possible to prevent a small or medium sized animal from unexpectedly actuating the trap. Secondly, the bear must initially exert a relatively large force to move the bait container 7 (FIG. 18) toward the access opening 3, but such a large force is utilized to cause the noosing loop 6a to be quickly contracted in diameter once the stopper flange 54 passes through the neck 53, thereby decreasing the chance of escape of the trapped bear.

Figure 20:
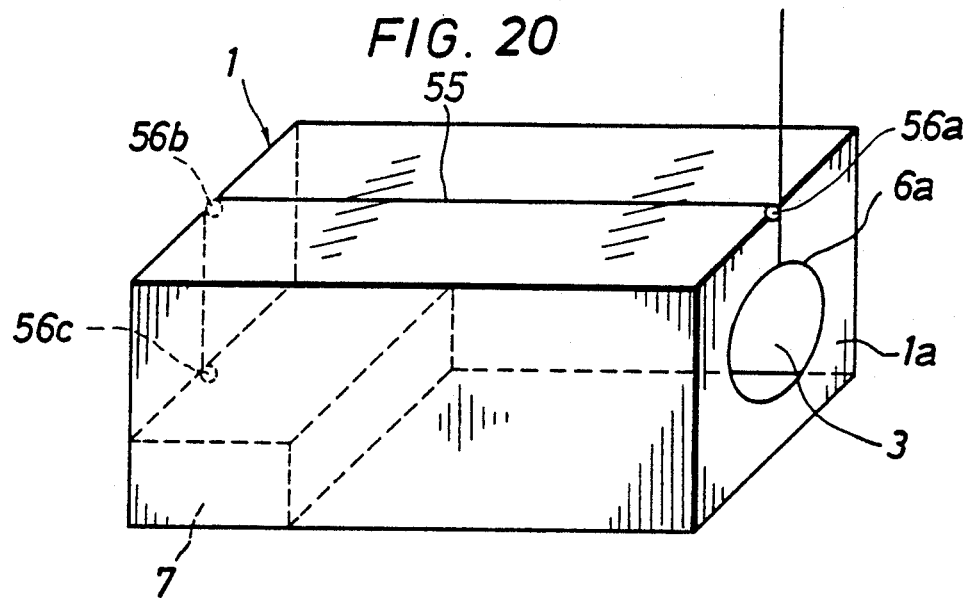
FIG. 20 is a schematic perspective view showing a noosing bear trap according to an eighth embodiment of the invention.

FIG. 20 illustrates still another bear trap which differs from that of FIG. 18 only in that a pull line 55 is used as a trigger means. Specifically, the pull line 55 is connected at one end to the capturing wire 6 slightly before the noosing loop 6a and at the other end to the rear of the bait container 7. Guide pulleys 56a, 56b, 56c mounted on the main body 1 facilitate the movement of the pull line 55.

As readily appreciated, the pull line 55 is pulled by the forward movement of the bait container 7 to initiate diametrical reduction of the noosing loop 6a. It is of course preferable that the connection between the pull line 55 and the capturing wire 6 be breakable under a large force applied by the escaping movement of the trapped bear.

Figure 21:
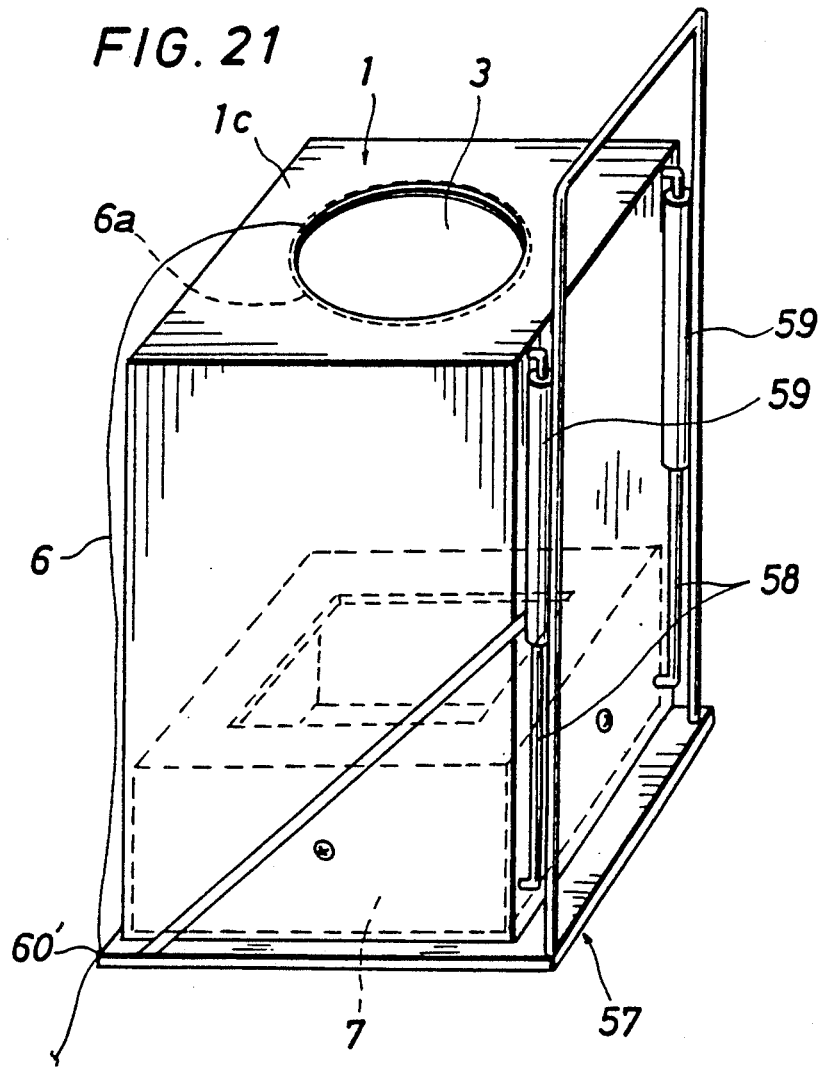
FIG. 21 is a schematic perspective view showing a noosing bear trap according to a ninth embodiment of the invention.

Referring to FIG. 21 showing a further embodiment, a rectangular parallelepiped main body 1 is supported on a support frame 57. The main body 1 has a top wall 1c formed with an access opening 3 at which is arranged a noosing loop 6a of a capturing wire 6 in a manner similar to the embodiment of FIGS. 1 to 4. A bait container 7 is fixedly mounted within the main body 1 at a position suitably spaced from the access opening 3. The main body 1 is provided with a pair of vertical guide rods 58 which are slidably guided in a corresponding pair of vertical guide tubes 59 fixed to the support frame 57, so that the main body is vertically movable relative to the support frame. The capturing wire 6 is relatively weakly connected at an intermediate portion thereof to the support frame 57, as indicated at 60.

A bear trying to take the bait (not shown) will grasp the bait container 7 to lift it. Such lifting of the container 7 also causes the upward movement of the main body 1 relative to the support frame 57, whereas the wire connection 60 remains in the same position. As a result, the noosing loop 6a is diametrically contracted to be tightened around the bear's arm and removed from the access opening 3. The connection 60 will be broken by a large force subsequently applied by the escaping movement of the captured bear, thereby preventing adverse influences to the trap as a whole.

Figure 22:
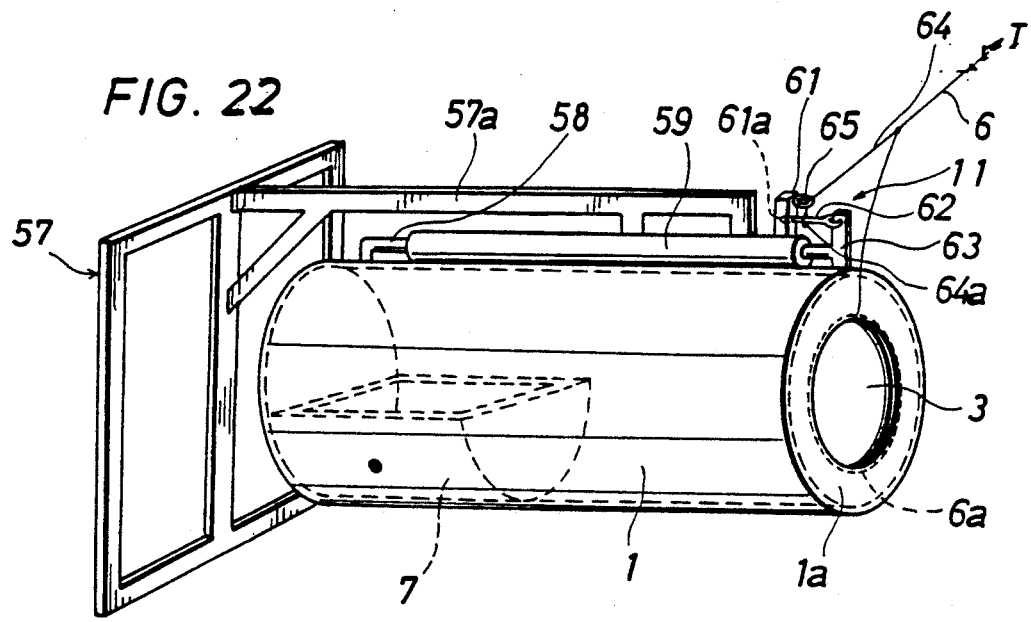
FIG. 22 is a schematic perspective view showing a noosing bear trap according to a tenth embodiment of the invention.

In a further embodiment illustrated in FIG. 22, a cylindrical main body 1 has a front wall 1a formed with an access opening 3 at which is seated a noosing loop 6a of a capturing wire 6. A bait container 7 is fixedly mounted within the main body at a position spaced from the access opening 3. A support frame 57 has a cantilever arm 57a provided with a horizontal guide tube 59. The main body 1, on the other hand, is provided with a horizontal guide rod 58 slidably passing through the guide tube 59, so that the main body is horizontally movable relative to the support frame.

According to the embodiment of FIG. 22, the capturing wire 6 is subjected to a pre-tension T in a manner similar to the embodiment of FIGS. 1 to 4, but such a pre-tension is blocked by a tension blocking device 11.

The tension blocking device 11 of this embodiment comprises a latch 61 fixed to the guide tube 59 and having an engaging hole 61a. A pivotal locking rod 62 is pivotally connected to a mount bracket 63 fixed on the main body 1, and has a free end normally engaging into the engaging hole 61a of the latch 61. An anchoring wire 64 is provided at one end with a connecting loop 64a fitting on the locking rod 62, and passed through a guide ring or member 65 for connection at the other end to the capturing wire 6 before the noosing loop 6a. Thus, the pre-tension T is normally supported by the tension blocking device 11. The guide ring 65, which may be mounted on the latch 61, serves to locate the connecting loop 64a of the anchoring wire 64 close to the free end of the locking rod 62 irrespective of the direction in which the pre-tension T is applied.

According to the above arrangement, the movement of the main body 1 causes the locking rod 62 to disengage from the latch 61. The thus disengaged rod 62 pivots upward under the pre-tension T, thereby allowing the connecting loop 64a to slip off the rod 62. As a result, the pre-tension T is applied to the noosing loop 6a for initial diametrical reduction thereof.

Figure 23:
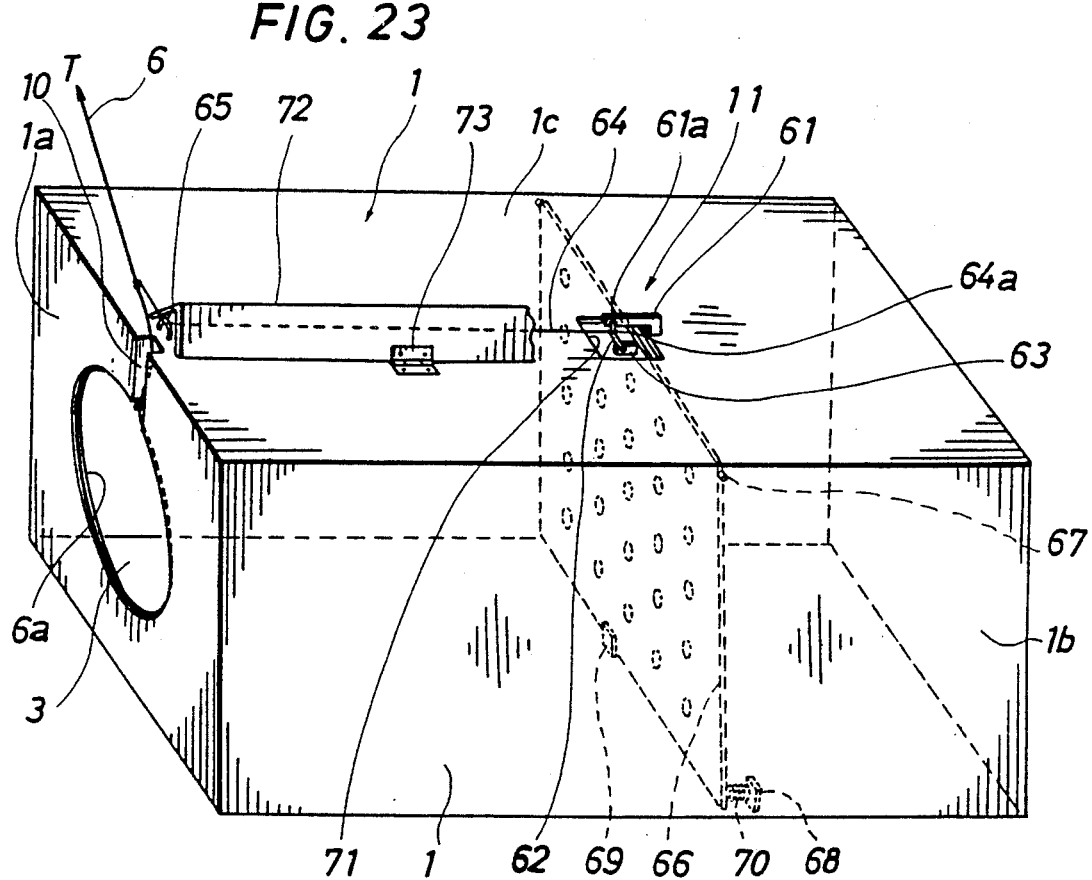
FIG. 23 is a perspective view showing a bear trap according to an eleventh embodiment of the invention.

FIG. 23 shows another bear trap which comprises a rectangular parallelepiped main body 1 having a front wall 1a formed with an access opening 3 as well as with a guide cutout 10 for guiding out a capturing wire 6. The capturing wire, which is subjected to a pre-tension T, has a noosing loop 6a located at the access opening. Within the interior of the main body is disposed a vertical partition plate 66 which is pivotable about a pivotal axis positioned close to the top wall 1c of the main body. The bottom wall 1d of the main body is provided with a pair of bearing brackets 68 behind the partition plate as well as with a stopper bracket 69 in front of the partition plate. A coil spring 70 is interposed between the partition plate and each bearing bracket 68 to normally press the partition plate against the stopper bracket 69. A bait (not shown) may be placed directly on the bottom plate 1d behind the partition plate. The partition plate is perforated to enable the smell of the bait to induce a bear passing nearby the trap.

The pre-tension T applied to the capturing wire 6 is blocked before the noosing loop 6a by a tension blocking device 11. This tension blocking device includes a pivotal locking rod 62 which is pivotally supported by a mount bracket 63 fixed to the partition plate 66. The pivotal rod projects out of the main body 1 through an opening 71 formed in the top wall 1c of the main body. The tension blocking device also includes a latch 61 fixed to the top wall 1c and having an engaging hole 61a. The locking rod 62 has a free end engaging in the engaging hole 61a of the latch. The tension blocking device further includes an anchoring wire 64 formed at one end with a connecting loop 64a fitting on the locking rod 62. The anchoring wire extends toward the front wall 1a of the main body and is guided by a guide member 65 before being connected at the other end to the capturing wire 6.

The tension blocking device 11 may be protected by a roof member 72 which is hinged at 73 to the top wall 1c of the main body. The roof member is hingeably openable to enable access to the tension blocking device for resetting thereof.

With the arrangement illustrated in FIG. 23, when a bear tries to take the bait (not shown) behind the partition plate 66, the bear's hand must press the partition plate against the springs 70, causing the partition plate to pivot about the axis 67. As a result, the locking rod 62 is pulled downward out of engagement with the latch 61 and releases the anchoring wire 64 by subsequent pivotal movement, thereby allowing the pre tension T to be applied to the noosing loop 6a for diametrical reduction thereof. Obviously, this arrangement is advantageous in that the bear or other unwanted animals will never succeed in taking the bait, so that the bait once placed may be repetitively used.

Figure 24:
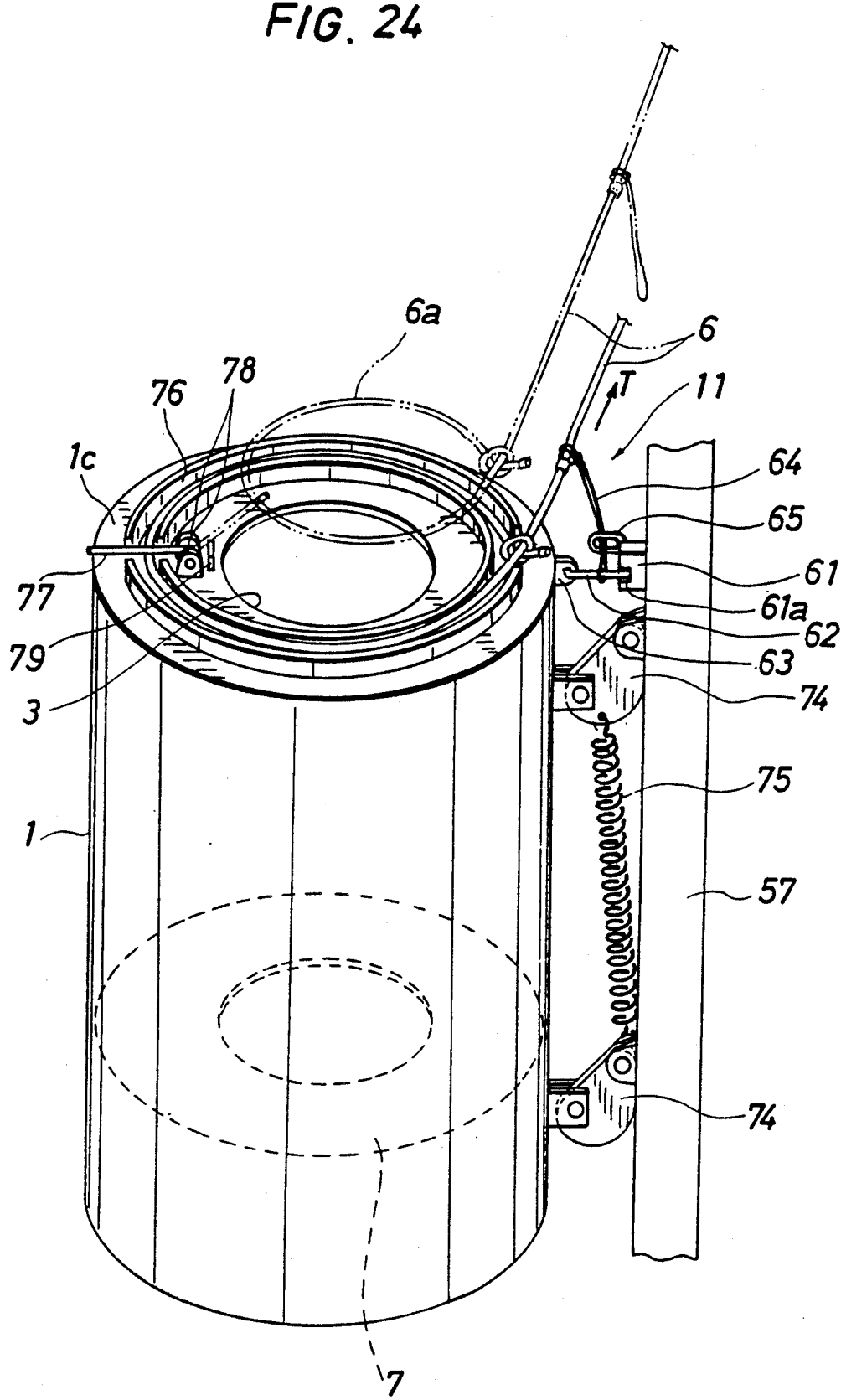
FIG. 24 is a perspective view showing a bear trap according to a twelfth embodiment of the invention.

FIG. 24 shows a further bear trap which utilizes a tension blocking device 11. This bear trap comprises a support frame 57 (shown only partially) to which is mounted a main body 1 having a fixed bait container 7 inside. Specifically, the main body is mounted to the support frame by a vertically spaced pair of links 74 each pivotally connected to the main body and the support frame. The main body is held strongly in a lower position by a coil spring 75 which is connected at one end to the upper link and at the other end to a bracket (on the side of the support frame 57) for the lower link.

The main body 1 has a top wall 1c formed with an access opening 3. This access opening is surrounded by an annular seating groove 76 in which a noosing loop 6a of a capturing wire 6 is seated. A guide rod 77 is pivotally supported by a pair of brackets 78 located between the access opening 3 and the seating groove. Normally, the guide rod 77 lies above the noosing loop 6a, but may be pivoted upward to assume an inclined posture (indicated by phantom lines) in which it is supported by a stopper member 79 fixed on the top wall 1c of the main body close to the access opening 3.

The tension blocking device 11 blocks a pre-tension T applied to the capturing wire 6. This tension blocking device includes a pivotal locking rod 62 which is pivotally supported by a mount bracket 63 fixed to the main body 1, and a latch 61 fixed to the support frame 57 and having an engaging hole 61a. The locking rod 62 has a free end engaging in the engaging hole 61a of the latch. The tension blocking device further includes an anchoring wire 64 connected at one end to the locking rod 62 and at the other end to the capturing wire 6 before the noosing loop 6a. The anchoring line 64 is passed through a guide ring 65 fixed to the latch 61, so that the anchoring line engages with a specific portion of the locking rod 62 regardless of the direction in which the pre-tension T is applied.

In operation, when the main body 1 is lifted by a bear against the tension of the spring 75 and the gravity, the main body is also displaced laterally away from the support frame 57 because of the function provided by the links 74. Such lateral displacement of the main body causes the locking rod 62 to be pulled out of engagement with the latch 61, thereby allowing the anchoring wire 64 to slip off the locking rod 62. As a result, the pre tension T is applied to the noosing loop 6a for diametrical contraction thereof. Further, the pre-tension T also functions to lift the noosing loop 6a off the seating groove 76, so that the guide rod 77 is pivoted up to assume the inclined guide position indicated by phantom lines in FIG. 24. Therefore, the noosing loop 6a is guided up by the guide rod 77 while diametrically reducing, thus arresting the bear's arm at a lifted position. Such an arrangement is advantageous in that the noosing loop will catch a suitable portion of the bear's arm to prevent subsequent escape even if the distance between the access opening 3 and the bait container 7 is insufficient.

The spring 75 fulfils two main functions. First, it strongly holds the main body 1 in the lowest position, so that the trap will not be erroneously actuated by an accidental external force which may be applied by an unwanted small or medium sized animal. Secondly, the spring enables the trap to be arranged horizontally because it can hold the main body close to the support frame 57 even without the help of the gravity.

Figure 25:
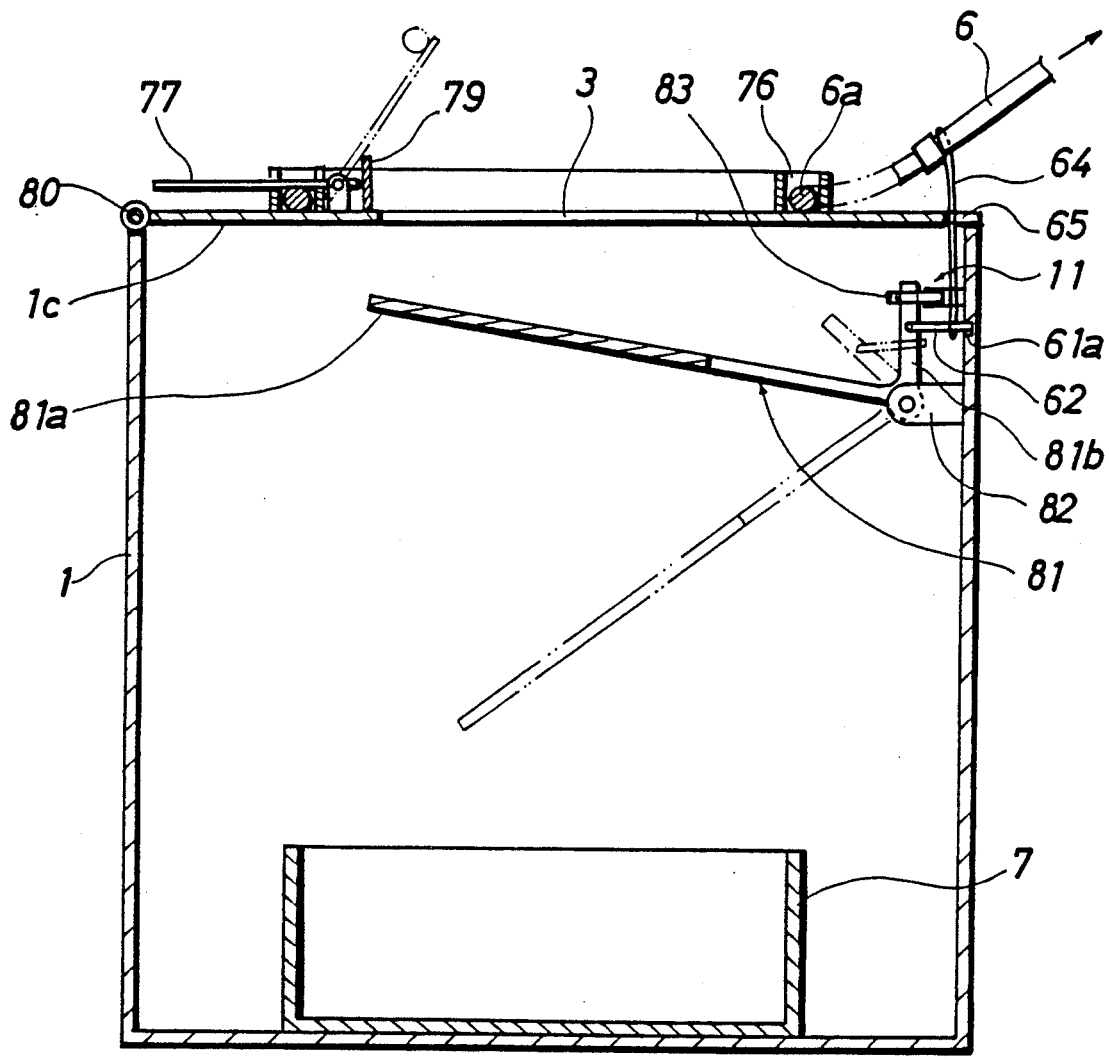
FIG. 25 is a sectional side view showing a bear trap according to a thirteenth embodiment of the invention.
Figure 26:
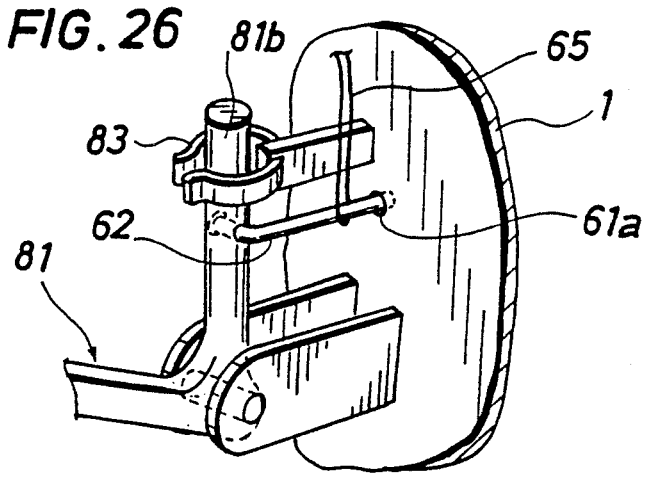
FIG. 26 is a fragmentary perspective view showing a principal portion of the bear trap shown in FIG. 25.

FIGS. 25 and 26 shows a modification of the embodiment shown in FIG. 24. This modified bear trap includes a main container 1 in which is arranged a bait container 7. The main body has a top wall 1c which is rendered pivotally openable by means of a hinge 80. The top wall has an access opening 3 which is surrounded by an annular seating groove 76 for receiving a noosing loop 6a of a capturing wire 6. The top wall is further provided with a pivotal guide rod 77 and a stopper member 79 substantially in the same arrangement as shown in FIG. 24.

Within the main body 1 is disposed a trigger lever 81 pivotally supported by a bracket 82 fixed to the main body. The trigger lever has a plate portion 81a arranged immediately below the access opening 3, and a leg portion 81b removably caught by a clip member 83 (see FIG. 26) fixed to the main body.

The capturing wire 6 is subjected to a pre-tension T, but such a pre-tension is blocked before the noosing loop 6a by a tension blocking device 11 which comprises a locking rod 62 and an anchoring wire 64. The locking rod 62 is pivotally connected to the leg portion 81b of the trigger lever 81 and has a free end engaging in a latch hole 61a formed in a wall of the main body 1. The anchoring wire 64 has one end fitted on the locking rod, and is guided out through a guide opening or cutout 65 formed in the top wall 1c of the main body for connection at the other end to the capturing wire 6.

Normally, the plate portion 81a of the trigger lever 81 is held immediately below the access opening 3 by the clip member 83 retaining the lever leg portion 81b. However, when a bear tries to reach the bait container 7, the bear's hand must pivot down the lever plate portion 81a, causing the lever leg portion 81b to disengage from the clip member 83. As a result, the locking rod 62 is pulled out of the latch hole 61a, which allows the anchoring wire 64 to slip off the locking rod. Subsequently, the trap of this embodiment functions in the same manner as the trap of FIG. 24.

Figure 27:
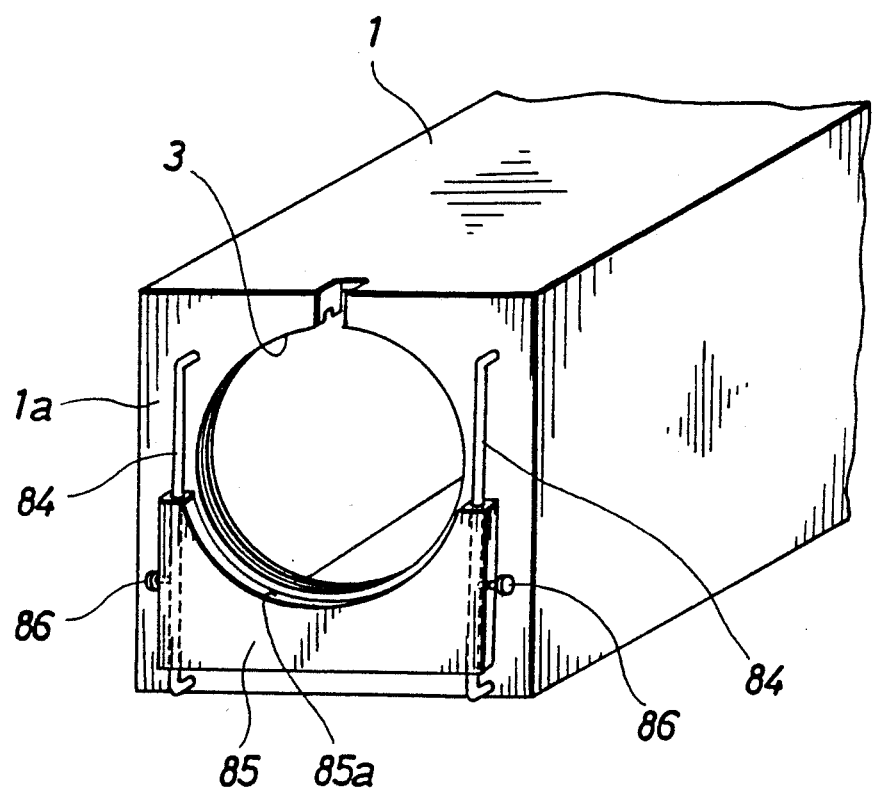
FIG. 27 is a perspective view showing an opening adjusting device to be combined with various bear traps of the present invention.

FIG. 27 shows an opening adjusting device which can be combined with the various traps described hereinbefore. In FIG. 27, the opening adjusting device is shown to include a pair of guide rods 84 mounted on the front wall 1a of a rectangular parallelepiped main body 1 on both sides of an access opening 3. A shaped plate 85 having an arcuate cutout 85a is slidably guided by the guide rods 84. The shaped plate may be lockable at any adjusted position by means of set screws 86.

The access opening 3 may be made large enough to allow entry of hands or arms of any kinds of bears. The shaped plate 85, on the other hand, is used to alter the effective area of the access opening, thereby adjusting the access opening to suit a particular kind of bears depending on the locality in which the trap is used.

The invention being thus described, it is obvious that the same may be varied in many other ways. Such variations are not to be regarded as a departure from the spirit and scope of the invention, and all such modifications as would be obvious to those skilled in the art are intended to be included within the scope of the following claims.

We claim:
1. A noosing bear trap comprising:
a main body defining an interior space, said main body being provided with at least one access opening which allows insertion of a bear's hand into said interior space for taking a bait placed therein at a position spaced from said access opening;
a capturing wire fixable at one end and formed at the other end with a diametrically variable noosing loop located at or adjacent said access opening; and
trigger means which causes said noosing loop to be tensioned for diametrical reduction in response to the movement of the bear's hand for taking the bait; wherein said capturing wire is normally subjected to a pre-tension; and said trigger means includes a tension blocking device which normally blocks said pre-tension of said capturing wire before said noosing loop but allows said pre-tension to be applied to said noosing loop in response to the movement of the bear's hand for taking the bait.

2. The bear trap as defined in claim 1, wherein said trigger means further includes a bait container arranged within said main body, said container being movable relative to said main body to cause said pre-tension to be applied to said noosing loop.

3. The bear trap as defined in claim 2, wherein said trigger means further includes at least one rod movable with said bait container to cause said tension blocking device to apply said pre-tension to said noosing loop.

4. The bear trap as defined in claim 3, wherein said tension blocking device comprises:
   an intermediate line connected at one end to said capturing wire at a position before said noosing loop;
   an L-shaped member having one leg fittingly engaging with the other end of said intermediate line;
   an anchoring line fixed at one end, the other end of said anchoring line fittingly engaging with said one leg of said L-shaped member;
   a ring into which said anchoring line and the other leg of said L-shaped member are inserted; and
   a triggering line connected at one end to said ring and at the other end with said rod.

5. The bear trap as defined in claim 4, wherein said main body has a guide opening through which said intermediate line is taken out of said main body, said capturing wire being provided with a line stopper at a position before said noosing loop for engagement with said one end of said intermediate line.

6. The bear trap as defined in claim 4, wherein said main body has a front wall formed with said access opening, said front wall being further formed with a corner opening through which said rod projects out of said main body.

7. The bear trap as defined in claim 6, wherein said front wall is provided with a guide ring, said triggering line being guided out of said main body through said guide ring and said corner opening.

8. The bear trap as defined in claim 1, wherein said main body is movably held by a support, said tension blocking device being actuated by the movement of said main body relative to said support to allow said pre-tension to be applied to said noosing loop.

9. The bear trap as defined in claim 8, wherein said main body is provided therein with a fixed bait container.

10. The bear trap as defined in claim 8, wherein said main body is movable horizontally relative to said support.

11. The bear trap as defined in claim 10, wherein said support is provided with at least one horizontal guide tube, and said main body is provided with at least one horizontal guide rod inserted through said guide tube.

12. The bear trap as defined in claim 8, wherein said main body is mounted to said support by means of a spaced pair of links, each of said links being pivotally connected both to said main body and said support.

13. The bear trap as defined in claim 12, further comprising a coil spring connected at one end to one of said links, the other end of said coil spring being fixed to said support.

14. The bear trap as defined in claim 1, wherein said main body has a top wall formed with said access opening which is surrounded by an annular seating groove for receiving said noosing loop, the trap further comprising a guide rod pivotally supported on said top wall at a position between said seating groove and said access opening, said guide rod being pivotable to assume a first posture lying on a portion of said noosing loop, said guide rod further being pivotable to assume a second inclined posture for guiding said noosing loop away from said seating groove during diametrical reduction thereof.

15. The bear trap as defined in claim 14, wherein said second inclined posture of said guide rod is provided by a stopper member mounted on said top wall of said main body.

16. The bear trap as defined in claim 8, wherein said tension blocking device comprises:
   a latch fixed to said support;
   a pivotal locking member pivoted to said main body and normally engaging with said latch, said locking member being disengageable from said latch upon movement of said main body relative to said support; and
   an anchoring line connected at one end to said capturing wire at a position before said noosing loop and fittingly engaging at the other end with said locking member, so that said anchoring line normally bears said pre-tension of said capturing wire but allows said pre-tension to be applied to said noosing loop when said locking member is disengaged from said latch.

17. The bear trap as defined in claim 16, wherein said anchoring wire is passed through a guide ring fixed to said latch.

18. The bear trap as defined in claim 1, wherein said trigger means further includes a partition plate pivotally supported within said main body, said tension blocking device being actuated by the pivotal movement of said partition plate to allow said pre-tension to be applied to said noosing loop.

19. The bear trap as defined in claim 18, wherein said tension blocking device comprises:
   a latch fixed to said main body;
   a pivotal locking member pivoted to said partition plate and extending out through an outlet opening of said main body for engagement with said latch, said locking member being disengageable from said latch upon pivotal movement of said partition plate; and
   an anchoring line connected at one end to said capturing wire at a position before said noosing loop and fittingly engaging at the other end with said locking member, so that said anchoring line normally bears said pre-tension of said capturing wire but allows said pre-tension to be applied to said noosing loop when said locking member is disengaged from said latch.

20. The bear trap as defined in claim 19, further comprising a roof member hinged to said main body for protecting said tension blocking device.

21. The bear trap as defined in claim 1, wherein said trigger means further includes a trigger lever pivotally mounted within said main body and having a plate portion in facing relation to said access opening, said tension blocking device being actuated by the pivotal movement of said trigger lever to allow said pre-tension to be applied to said noosing loop.

22. The bear trap as defined in claim 21, wherein said trigger lever has a leg portion disengageably caught by retaining means to normally hold said plate portion of said trigger lever in facing relation to said access opening.

23. The bear trap as defined in claim 22, wherein said tension blocking device comprises:
   a latch hole formed in a wall of said main body;
   a pivotal locking member pivoted to said leg portion of said trigger lever and normally engaging with said latch hole, said locking member being disengageable from said latch hole upon pivotal movement of said trigger lever; and
   an anchoring line connected at one end to said capturing wire at a position before said noosing loop and fittingly engaging at the other end with said locking member, said anchoring line passing through an guide opening of said main body, whereby said anchoring line normally bears said pre-tension of said capturing wire but allows said pre-tension to be applied to said noosing loop when said locking member is disengaged from said latch hole.

24. The bear trap as defined in claim 1, wherein said access opening is provided with a shaped plate which is adjustable in position to alter the effective opening area of said access opening.

25. A noosing bear trap comprising:
   a main body defining an interior space, said main body being provided with at least one access opening which allows insertion of a bear's hand into said interior space for taking a bait placed therein at a position spaced from said access opening;
   a capturing wire fixable at one end and formed at the other end with a diametrically variable noosing loop located at or adjacent said access opening; and
   trigger means which causes said noosing loop to be tensioned for diametrical reduction in response to the movement of the bear's hand for taking the bait; wherein
   said trigger means includes an L-shaped lever having a longer horizontal leg and a shorter vertical leg, said lever being pivotable at a bend between said two legs, said horizontal leg being supported on a top wall of said main body and having a free end connected to said capturing wire before said noosing loop, said vertical leg extending into said main body and having a free end engaging with a bait container which is movable relative to said main body, said lever being pivoted in response to the movement of said bait container, said free end of said vertical leg being displaced by an amount corresponding to the movement of said bait container relative to said main body, said free end of said horizontal leg being displaced by a larger amount to cause diametrical reduction of said noosing loop.

26. The bear trap as defined in claim 25, wherein said top wall of said main body is formed with a pair of bent riser portions defining a neck immediately above said access opening, said capturing wire being provided with a fixed stopper flange engaging with said neck from below, said free end of said horizontal leg of said lever engaging with said stopper flange from below.

27. A noosing bear trap comprising:
   a main body defining an interior space, said main body being provided with at least one access opening which allows insertion of a bear's hand into said interior space for taking a bait placed therein at a position spaced from said access opening;
   a capturing wire fixable at one end and formed at the other end with a diametrically variable noosing loop located at or adjacent said access opening; and
   trigger means which causes said noosing loop to be tensioned for diametrical reduction in response to the movement of the bear's hand for taking the bait; wherein
   said main body is movably held by a support, said trigger means being actuated by the movement of said main body imparted by the movement of the bear's hand for taking the bait.

28. The bear trap as defined in claim 27, wherein said trigger means comprises a connection between said capturing wire and said support, whereby said capturing wire is pulled to apply tension to said noosing loop upon movement of said main body.

29. The bear trap as defined in claim 27, wherein said main body is movable vertically relative to said support.

30. A noosing bear trap comprising:
   a main body defining an interior space, said main body being provided with at least one access opening which allows insertion of a bear's hand into said interior space for reaching a bait container movably arranged in said main body at a position spaced from said access opening;
   a capturing wire fixable at one end and formed at the other end with a diametrically variable noosing loop located at or adjacent said access opening; and
   trigger means which causes said noosing loop to be tensioned for diametrical reduction in response to the movement of the bear's hand for taking the bait; wherein said trigger means comprises:
   at least one pusher rod movable with said bait container and projectable out of said main body adjacent said access opening;
   an external movable member connected to the projectable end of said pusher rod for movement therewith, said movable member being provided with a second access opening corresponding in position and size to said access opening of said main body, said noosing loop being located at said second access opening; and
   a pull line which is pulled in opposite direction to the moving direction of said container, one end of said pull line being connected to said capturing wire, so that said noosing loop is tensioned upon movement of said bait container.

31. The bear trap as defined in claim 30, wherein the other end of said pull line is directly connected to said bait container.

32. The bear trap as defined in claim 30, wherein said main body is provided with a fixed pulley, and said bait container is provided with a running pulley, said pull line being reeved through said fixed and running pulleys, the other end of said pull line being fixed to said main body.

33. The bear trap as defined in claim 30, wherein said trigger means further includes:
   a rotary shaft rotatably supported by said main body,
   an actuating line wound on said said rotary shaft and extended for connection to said bait container; and
   a magnifying pulley mounted on said rotary shaft for rotation therewith, said magnifying pulley being connected to the other end of said pull line for winding up thereof.

34. The bear trap as defined in claim 30, wherein said trigger means further includes:

a rotary shaft rotatably supported by said main body and formed with a tooth portion; a rack carried by said bait container and held in mesh with said toothed portion of said rotary shaft; and a magnifying pulley mounted on said rotary shaft for rotation therewith, said magnifying pulley being connected to the other end of said pull line for winding up thereof.

35. The bear trap as defined in claim 30, further comprising urging means for urging said bait container in a returning direction.

36. A noosing bear trap comprising:

a main body defining an interior space, said main body being provided with at least one access opening which allows insertion of a bear's hand into said interior space for taking a bait placed therein at a position spaced from said access opening;

a capturing wire fixable at one end and formed at the other end with a diametrically variable noosing loop located at or adjacent said access opening; and trigger means which causes said noosing loop to be tensioned for diametrical reduction in response to the movement of the bear's hand for taking the bait; wherein said main body is movably received in an outer casing, said trigger means being actuated by the movement of said main body imparted by the movement of the bear's hand for taking the bait.

37. The bear trap as defined in claim 36, wherein said main body is formed with a slot, said outer casing being provided with a pivotal arm having an engaging pawl engaging in said slot to limit the movement of said main body within a predetermined range.

38. The bear trap as defined in claim 36, further comprising a bait container movably arranged in said main body, said main body being formed with an intermediate container stopper which comes into abutment with said bait container after an initial small movement of said bait container, said main body being movable with said bait container after said bait container comes into abutment with said container stopper.

39. The bear trap as defined in claim 38, wherein said outer casing is provided with a pivotal lever normally engaging with said main body to prohibit movement thereof relative to said outer casing but disengages from said main body to allow movement thereof upon the initial small movement of said bait container relative to said main body.

* * * * *